United States Patent
Moutsokapas

(10) Patent No.: US 7,415,320 B2
(45) Date of Patent: Aug. 19, 2008

(54) OPTICAL DEVICE FOR THE AUTOMATIC LOADING AND UNLOADING OF CONTAINERS ONTO VEHICLES

(75) Inventor: Jannis Moutsokapas, Monheim (DE)

(73) Assignee: Gottwald Port Technology GmbH, Dusseldorf (DE)

( * ) Notice: Subject to any disclaimer, the term of this patent is extended or adjusted under 35 U.S.C. 154(b) by 179 days.

(21) Appl. No.: 10/506,460

(22) PCT Filed: Mar. 13, 2003

(86) PCT No.: PCT/EP03/02575

§ 371 (c)(1),
(2), (4) Date: Feb. 28, 2005

(87) PCT Pub. No.: WO03/078292

PCT Pub. Date: Sep. 25, 2003

(65) Prior Publication Data

US 2005/0192702 A1    Sep. 1, 2005

(30) Foreign Application Priority Data

Mar. 15, 2002    (DE) ................................ 102 12 590

(51) Int. Cl.
*G06F 7/00* (2006.01)
(52) U.S. Cl. .................................................. 700/213
(58) Field of Classification Search ............... 700/213
See application file for complete search history.

(56) References Cited

U.S. PATENT DOCUMENTS

| | | | | |
|---|---|---|---|---|
| 5,392,935 A | * | 2/1995 | Kazama et al. | 212/278 |
| 5,920,480 A | * | 7/1999 | Nakamura et al. | 700/114 |
| 6,052,627 A | * | 4/2000 | Nakamura | 700/182 |
| 7,165,929 B2 | * | 1/2007 | Janes et al. | 414/722 |

* cited by examiner

Primary Examiner—Gene O. Crawford
Assistant Examiner—Ramya G Prakasam
(74) Attorney, Agent, or Firm—Van Dyke, Gardner, Linn & Burkhart, LLP

(57) ABSTRACT

The invention relates to an automatic method for increasing the throughput of a container reloading point or a container storage space and for reducing the loading and unloading time for a container transport vehicle. According to said method, after the identification of a container transport vehicle, the loading platform of the transport vehicle that has been parked in the parking area of the container storage space is measured. The position co-ordinates of the loading platform are determined by a data processing system. The container to be loaded is then automatically positioned by means of a crane, using the position co-ordinates of the loading platform. To align the container exactly in relation to the loading platform, the latter is measured again and any deviation in relation to the position of the container thus obtained is used for said exact alignment. The container is deposited on the platform automatically. The unloading of a container transport vehicle involves practically identical steps.

31 Claims, 14 Drawing Sheets

OPTICAL DEVICE FOR THE AUTOMATIC LOADING AND UNLOADING OF CONTAINERS ONTO VEHICLES

BACKGROUND OF THE INVENTION

The invention pertains to a method for reloading in a container storage space for standard containers, with a stacker crane for the containers that services the container storage space and can be controlled by a DP (data processing) system for logistical management, which can travel between the storage location of each container and a loading platform of a container transport vehicle that can drive into the region of the container storage space, wherein the stacker crane has a means of picking up the container from the loading platform and/or setting it down onto the platform, such as can be oriented with respect to the latter.

Container storage yards are required for short-term interim storage of standard containers, in order to enable the transfer of containers from one means of transport to another. Means of container transport are generally large container ships, railroad cars, trucks, trailers, or also AGVs (automated guided vehicles). At a container harbor, container ships are unloaded and the unloaded containers are temporarily kept in the container yard until further transport is possible. Vice versa, the containers are assembled and kept temporarily in a container yard of a harbor in order to be loaded subsequently onto a container ship. The land transport occurs by truck, trailer, railroad car or AGV, and in the present application the land transport is furnished by special trucks.

The large number of containers handled at a container yard requires fast and accurate loading and unloading of the means of transportation. A stacker crane transports the container from the container yard to the transport vehicle and vice versa. The stacker crane can be an automatic container stacker crane (ACS), or also a gantry crane or a one-legged gantry crane. Thus far, the placement of the container onto a means of transport by the stacker crane has been manually controlled. The stacker crane consists of a bridge and a trolley which can travel on it, while the bridge can travel on rails. The placing of the container suspended from the crane onto a transport vehicle is manually controlled by an operator. For the loading, an operator present in the parking position drives the container by means of the stacker crane into the vicinity of the transport vehicle, and then by slow "approach" he positions the container exactly on the transport vehicle. The approach involves repeated left/right and forward/backward moving of the ACS, as well as the lowering of the container, controlled and monitored by the operator on site. Likewise, when unloading the transport vehicle, the stacker crane is slowly brought up to the container manually by an operator, so that the crane can pick it up.

The large number of containers handled within a container yard necessitates a smooth, error-free, speedy, economical and long-lasting work process. In addition, it is desirable to increase the throughput of containers, i.e., the number of containers handled per unit of time. This will reduce the parking time for containers inside the container yard, the layover time for container ships, and the stopping time for the land transport vehicles. At the same time, this implies a shortening of the length of transport for the containers.

From European patent application EP 1 043 262 A1 there is already known a method for handling of standard containers at a container yard. This container yard has a controllable stacker crane for the containers, which can travel between a storage position for the container and a transport vehicle with a loading platform for the container. The stacker crane is provided with a means of picking up the load in order to set the container down on the loading platform or pick it up from the platform, such as can be oriented with respect to the container and the loading platform. The stacker crane also has a horizontally moveable trolley with a lifting mechanism, from which is suspended the means of picking up the container. On this load suspension device is arranged a sensor in the form of a video camera system, so as to automatically place the load suspension device on the container or pick up the container from the loading platform. Furthermore, a second sensor also in the form of a video camera system is fastened to the load suspension device, in order to adjust the stacker crane. The reference point for this is a wall with optical elements, which is arranged in the region of the parking place of the transport vehicle.

Furthermore, there is also already known from the international patent application WO 01/81233 A1 a system for orienting a load suspension device for containers. The load suspension device, designed as a spreader, has a CCD camera in the region of its twist locks for fastening the spreader to the corner points of a container. Thanks to the video signal obtained from the camera, an operator can thus set this spreader down in true position on a container in relation to its support points. This system can also work automatically in conjunction with a DP system.

SUMMARY OF THE INVENTION

The underlying problem of the invention is to achieve a high throughput of containers within a container yard, to lower the costs and to reduce the down time in case of defects, while at the same time boosting the economy of the container handling yard.

This problem is solved according to the invention by the indicated method for loading of transport vehicles with standard containers per claim 1, by the indicated method for unloading of transport vehicles with standard containers per claim 2, and by the indicated methods for adjusting the position of a stacker crane according to claims 17 and 19.

The illustrative embodiments provide quick and flawless handling of the loading and unloading process of transport vehicles, made possible by automation. In the present application, the constantly recurring identical loading and unloading sequences are broken down into work steps and each of them is automated. The sequence of individual automated work steps with no interruption in time, such as require a shorter time to accomplish than the manual steps, and the mistake-free processing achieve a beneficial shortening of the time of the loading and unloading process and thus also boost the throughput of the containers handled.

The loading of a transport vehicle with a container occurs by the stepwise working of steps a) through f) of claim 1. Carrying out the work steps results in a shortening of the loading time of transport vehicles for standard containers, resulting in boosted throughput of the container handling yard. The resulting profitable time savings of the loading process comes from the individual savings accomplished by automating the work steps. At the same time, the number of mistake situations is reduced, which likewise has profitable impact on the throughput.

The unloading of the transport vehicle loaded with a container is described by the sequential working of steps a) through f) of claim 2. The carrying out of the work steps produces a shortening of the unloading time of transport vehicles for standard containers, leading to an increased throughput of the container handling yard. The resulting profitable time savings of the unloading process consists of the individual savings achieved by automating the work steps. At the same time, the number of mistake situations is reduced, which likewise has profitable impact on the throughput.

It is advantageous that the transport vehicle and possibly the container being unloaded are identified and the thus-generated data are transmitted to the DP system of the logistical management. At the same time, the DP system of the logistical management generates a loading order or unloading order for the stacker crane. This loading order contains the job for the stacker crane to pick up the container being loaded in the container yard and put it down on the loading platform of the transport vehicle, so as to load the transport vehicle in this way. This unloading order contains the job for the stacker crane to pick up the container being unloaded from the transport vehicle and store it in the container yard. The time advantage created by having parallel work steps contributes to shorten the duration of the loading process, as does the fewer mistakes when detecting and transmitting the vehicle data.

Furthermore, the illustrative embodiments, identification points defined by means of a calibrated camera system on the loading platform of the transport vehicle or the container and their coordinates are transmitted to the DP system of the logistical management. From the identification points, the DP system determines the coordinates of the means of fastening of the transport vehicle or of the container being unloaded (the corresponding system of coordinates describes at least a space reached by the fastener of the load suspension device of the stacker crane). This method enables a quick and error-free detection of the position of the fastener for the container or that of the container itself, contributing to reduce the loading time for a transport vehicle.

In the illustrative embodiments, the DP system of the logistical management compares the coordinates of the identification points with data about the container being loaded, which is stored in the DP system, and determines the fastener being assigned to this container and the position coordinates on the loading platform of the transport vehicle. The coordinates stored in the DP system as to the size of the container can be compared in good time with the coordinates determined for the fastener of the transport vehicle. If the size of the loading platform of the transport vehicle is sufficient for the container being loaded, the fastener of the transport vehicle to be assigned will be determined. In the event that the loading platform of the transport vehicle is not large enough for the container being loaded, a premature termination of the loading process/loading order can occur, or the time-intensive picking up of the container from the container yard by the stacker crane can be prevented in good time, which represents a considerable time savings.

After the successful detecting of the coordinates of the fastener, the loading process can begin at once for the transport vehicle located in the parking position, For this, the stacker crane travels under computer control with the container being loaded above the loading platform of the transport vehicle, overlapping it exactly, and above the position coordinates. The immediate and exact positioning of the stacker crane above the transport vehicle reduces the duration of the loading process thanks to elimination of the manual "approach".

In the illustrative embodiments, the DP system of the logistical management determines the fastener and position coordinates of the container from the identification points. This enables a quick and error-free calculation of the position coordinates, for the immediate starting of the unloading order for the transport vehicle.

For this, the stacker crane travels under computer control above the container, overlapping it exactly, and above the position coordinates. The immediate and exact positioning of the load suspension device above the container being unloaded reduces the time of the unloading process by eliminating the manual "approach".

The fastener of the loading platform or of the container may be detected by means of a calibrated camera system mounted on the stacker crane, and the load suspension device or the container is moved so that the fastener of the container or of the load suspension device stands congruently above the assigned fastener of the loading platform or of the container. This enables a rapid, error-free, and correct orientation of the container with respect to the loading platform or that of the load suspension device with respect to the container. In contrast with the previous method, the time-intense "approach" of the container or the load suspension device by an operator present in the parking position is eliminated. It is advantageous that the visual monitoring can thus occur from a remote operator, who watches the picture of at least one camera. Likewise, the uninterrupted sequence of the individual process steps helps reduce the loading time.

As a result of precise orientation of the container with respect to the loading platform, the container can be put down on the loading platform of the transport vehicle in such a way that the fastener of the container mate with the corresponding fastener of the loading platform at the end of the lowering process. The disadvantageous "approach" of the load suspension device with the container, guided by an operator present on site, is eliminated and thus produces a beneficial timesavings. The container is deposited by the load suspension device on the transport vehicle and released. The loading job of the stacker crane is finished.

As a result of fast and exact orienting of the fastener of the load suspension device with respect to the container, the load suspension device can be brought up to the container in such a way that the fastener of the load suspension device mate with the fastener of the container. The disadvantageous "approaching" of the load suspension device to the container, guided by an operator, is eliminated and thus produces an advantageous time savings. The container is removed from the transport vehicle and can be unloaded by the load suspension device, which then stores it temporarily in the container yard. The unloading job of the stacker crane is thus finished.

In the illustrative embodiments, an operator does not have to be on site before, during and after the loading or unloading process. Thus, an operator is available for other activities.

In the illustrative embodiments, the transport vehicle and possibly the container being unloaded are identified by means of a camera system. By elimination of visual and manual identification, the resulting data are transmitted faster and free of error to the DP system of the logistical management.

For detection of the coordinates of the identification points of the loading platform or of the container, an operator supported by a user-defined interface on a monitor screen of the DP system of the logistical management may use a marking mechanism to select the identification points of the loading platform or of the container on the user-defined interface. The user-defined interface shows the image of the camera system. An operator who selects the identification points of the loading platform or of the container of the transport vehicle or container represented on the user-defined interface with the marking mechanism, contributes to the error-free detection and quick calculation of the coordinates of the fastener of the loading platform of the transport vehicle.

Another automation technique which reduces the loading time or unloading time can be accomplished in that the coordinates of the identification points of the loading platform or of the container are automatically detected by a computer system and transmitted to the logistical management.

The process step described in claims 1 and 2 for determination of the position coordinates can be implemented in at least two different ways. First, the coordinates of the loading platform or of the container of the transport vehicle can be detected in the loading and unloading zone. At this time, the transport vehicle is already identified and the assigned container is likewise known by virtue of the loading order. This allows the DP system of the logistical management to recognize early on whether the transport vehicle is suitable to accommodate the container being loaded. If the fasteners of the loading platform of a transport vehicle are successfully assigned, the loading process will continue; otherwise, the loading process, if already started, will be interrupted.

In the event that the detection of the coordinates of the loading platform of the transport vehicle occurs in the final loading and unloading zone, the position coordinates described by the vertical position of the loading platform or the upper edge of the identification points of the container and by the intersection of the diagonals of the identification points of the loading platform, are the absolute target position of the container. The arrangement is thus extremely adroit and enables a quick and thus time-saving positioning of the automatic stacker crane with the container or without, above the loading platform being loaded or above the container being unloaded.

In the other embodiment of the invention of the process step described in claim 1 for determining the position coordinates, the detection of the coordinates of the loading platform of the transport vehicle or of the container in this case occurs in the identification zone. This allows the DP system of the logistical management to recognize early on whether the transport vehicle is suitable to accommodate the container being loaded. Once the fasteners of the loading platform of the transport vehicle are successfully assigned, the loading process will continue; otherwise, the loading process, if already started, will be interrupted.

Since the detection of the coordinates of the loading platform of the transport vehicle occurs in the identification zone, the coordinates detected for the loading platform refer to the transport vehicle. Thus, the vertical position of the loading platform and the intersection of the diagonals of the identification points of the loading platform describe the relative target position of the container.

The position coordinate of the container is described by the vertical position of the upper edge of the identification points of the container and by the intersection of the diagonals of the identification points of the container, which describes the relative target position of the container. By selecting the upper edge of the identification points (fastener) of the container as an element of the position coordinate, one can also unload standard containers not having a cover, such as open-top containers, tank containers and/or flat containers. Thus, the favorable choice of the position coordinate enables an adroit and thus time-saving positioning of the automatic stacker crane above the container being unloaded.

The coordinates of the loading platform or of the container that are detected in the identification zone refer to the transport vehicle and consequently describe the relative target position of the container or of the load suspension device. Advantageously, the position coordinate is described by the absolute target position of the container or the load suspension device, which is composed of the coordinates determined by means of a camera for the transport vehicle located in the parking position and the relative target position of the container or of the load suspension device. The coordinates already detected in the identification zone are linked to the position of the transport vehicle identified in the parking position by the DP system of the logistical management. The result of this linkage is the position coordinate, which is the absolute target position of the container or of the load suspension device. This enables an adroit and thus time-saving positioning of the automatic stacker crane with the container above the loading platform being loaded or the container being unloaded, as is described hereafter.

Regardless of where the detection of the coordinates occurs, a wrong position of one or more fasteners will be evident on the user-defined interface of the DP system. The operator recognizes the wrong positions and consequently notifies the driver of the transport means. He will correct any wrong positions of the fasteners in good time.

Regardless of the way chosen to detect the coordinates, the advantageous choice of the position coordinate will enable the load suspension device to move the container or the load suspension device into the range of the loading platform or of the container, so that the intersection of the diagonals of the fastener of the container or of the load suspension device stands congruent and plumb above the intersection of the diagonals of the fastener of the loading platform or of the container. The container or the load suspension device hanging from the stacker crane is thus situated in the middle above the loading platform or the container and must consequently be oriented in the possibly next work step by a rotary movement of the container hanging from the load suspension device or of the load suspension device. For this, the stacker crane need not travel any further, i.e., the bridge of an ACS and the trolley moving on it have already reached their exact final loading position. In the illustrative embodiments, the stepwise approach of the load suspension device, guided by an operator, is eliminated. This procedure enormously simplifies the positioning of the load suspension device or the stacker crane and thus contributes to an extremely large reduction in the required loading time or unloading time.

In the illustrative embodiments, simple watching of the loading process or unloading process by an operator is obtained by a second user-defined interface with four quadrants, each of them representing a pair of fasteners, while each pair consists of a fastener of the loading platform or container, projected by an image from the camera system, and the associated fastener of the container or load suspension device, projected by a superimposing of a computer-calculated contour of the container or the load suspension device and of the fastener onto the image. Thus, the operator comfortably watches the loading process or unloading process, without having to be present at the parking position.

In the illustrative embodiments, any deviation between the position of the container being loaded or the load suspension device and the position of the loading platform or the container being unloaded can be determined in the DP system of the logistical management for a fine-tuned positioning, in that the second user-defined interface of the logistical management has a marking mechanism with which the operator selects at least one identification point of the loading platform or of the container. The thus-determined precise orientation of the loading platform or of the container is used to orient the container with respect to the loading platform or the load suspension device. A deviation of the orientations recognized by the DP system of the logistical management results, during the next step of the work sequence, in a correcting of the position of the container or the load suspension device. The simple detecting of the position of the loading platform or container, the direct availability of the data in the DP system of the logistical management, and the excluding of errors from the data result in an exceptional time savings.

In the illustrative embodiments, any deviation in position of the container being loaded or the load suspension device with respect to the position of the loading platform or the container being unloaded is automatically recognized by a computer system for fine positioning.

When a deviation exists in the position of the container being loaded or the load suspension device with respect to the position of the loading platform or the container being unloaded, the container or the load suspension device is turned so that the fastener of the container or of the load suspension device stand congruently and plumb above the fastener of the loading platform or container. Such a fast and correct orienting of the container with respect to the loading platform or that of the load suspension device with respect to the container occurs automatically, based on the computed deviation. A tilting of the transport vehicle in its lengthwise and/or transverse direction, caused for example by uneven ground, does not have harmful impact on the loading process. The stepwise approach of the load suspension device with or without the container relative to the loading platform or the container may be eliminated, which produces an exceptional reduction in the time required for the loading or unloading of a transport vehicle.

The swift setting down and releasing of the container from the load suspension device or the swift approach of the load suspension device to pick up the container and the locking together of the fastener is guided by an operator or automatically by a computer system. Since the container or the load suspension device is precisely located above the loading platform or the container and is correctly oriented, and the DP system has determined the vertical position of the loading platform or the container, an immediate and continuous motion for depositing the container or the load suspension device can be carried out, and it can be concluded sooner than the manual "approach". The locking together of the fastener of the container and those in the loading platform completes the deposit of the container. After the load suspension device is no longer loaded with the container, which is indicated by the triggering of pressure sensors, the container can be released from the load suspension device and fastened to the transport vehicle. The locking together of the fastener of the load suspension device and those in the container completes the picking up of the container. The container is fastened to the load suspension device and the stacker crane places it in the container yard for temporary storage. Thus, the unloading job order is complete.

The continuous sequence of process steps enables a fast loading and unloading of a transport vehicle. The time saved in this way is available for other loading or unloading processes. Consequently, the throughput of containers handled in a container yard can be increased, which represents an efficiency boosting and likewise a reduction in the transport time of the transported freight.

Furthermore, an adjustment of a stacker crane may be possible at any time and with little expense by using the method described in claim 16. It should be kept in mind that geometrical deviations in a camera provided for use on the stacker crane can be produced by structural part tolerances, manufacturing tolerances, irregularities in the lens and/or optical errors, and can be circumvented by a calibration done prior to use of the camera. During operations, the image from a camera used on the stacker crane may be continuously corrected by means of a correction algorithm obtained from the calibration. Thus, the correction algorithm specific to the camera is applied to each image of a camera by the DP system of the logistical management. Consequently, each camera used has substantially identical optical properties if its corresponding correction algorithm is applied. In addition, the preliminary calibration allows the DP system of the logistical management to remotely measure the familiar objects being viewed, in accordance with the laws of optics.

By using this calibrated camera, a further adjustment of the position of the stacker crane can now be carried out. Per claim 16, the stacker crane first moves over a reference point situated at any given position within the container yard, so that at least one camera of the camera system catches the reference point. The DP system of the logistical management compares the new position of the reference point, calculated from the camera image, with its known position of the reference point and, if any deviation is present, it determines an offset for the stacker crane. Under the assumption that the reference point in general does not shift, a correction can be made in the position coordinate of the stacker crane by the DP system of the logistical management adding the offset to the calculated position data of the stacker crane. This may be useful in the case of a length change in the running rails of the automatic container stacker (ACS) crane, which is an expansion of length in summer and a contraction of the running rails in winter due to the temperature. Since the DP system of the logistical management may determine the position in terms of an absolute length measurement of the distance traveled by the stacker crane, the temperature-sensitive arrangements and positions that the stacker crane actually travels can be displaced from the position calculated by the DP system of the logistical management. Thus, it may be possible to correct an erroneous calculation of the position of the stacker crane caused by these factors of influence.

The stacker crane can be quickly adjusted as often as desired and at any given time.

Several reference points can be arranged within the container yard. After the stacker crane has placed itself above one of these reference points, the DP system of the logistical management can compare the position of the reference point already known to it with the new position calculated from a camera image, and calculate any offset for the stacker crane associated with the reference point. In the event that several reference points are located along the linear path of the stacker crane and one of the offsets of these reference points determined in a narrow time domain has a nonsystematic deviation, this indicates ground shifting in the vicinity of the affected reference point, which is afterwards introduced into the calculations for positioning of the stacker crane by the DP system of the logistical management as a correction. In this way, one can avoid any wrong interpretations of length expansions.

The container yard may have a super-reference point, with which each camera on the stacker crane can be adjusted relative to it. Replacing a camera mounted on the stacker crane due to a technical defect, etc., requires the onetime adjustment of a newly installed camera on the stacker crane. By using the super-reference point, the DP system of the logistical management can determine a correction vector and assign it to a new camera mounted on the stacker crane. The repair and adjustment time and thus the down time of the stacker crane are profitably shortened. The super-reference point may be situated at one position in the container yard that is independent of outside influences of the above described kind. The stacker crane travels with the newly installed and already calibrated camera above the super-reference point so that the newly installed camera detects it. The DP system determines the position of the super-reference point and compares the data thus obtained with the already stored data about the super-reference point. If there is any deviation in the data, a correction vector will be assigned to the newly installed camera, and it will be used during each position computation done on the basis of this camera. The timesaving achieved due to the swift adjustment of the newly installed camera on the stacker crane can be used profitably for loading and unloading processes.

DETAILED DESCRIPTION OF THE PREFERRED EMBODIMENT

Figure 1:
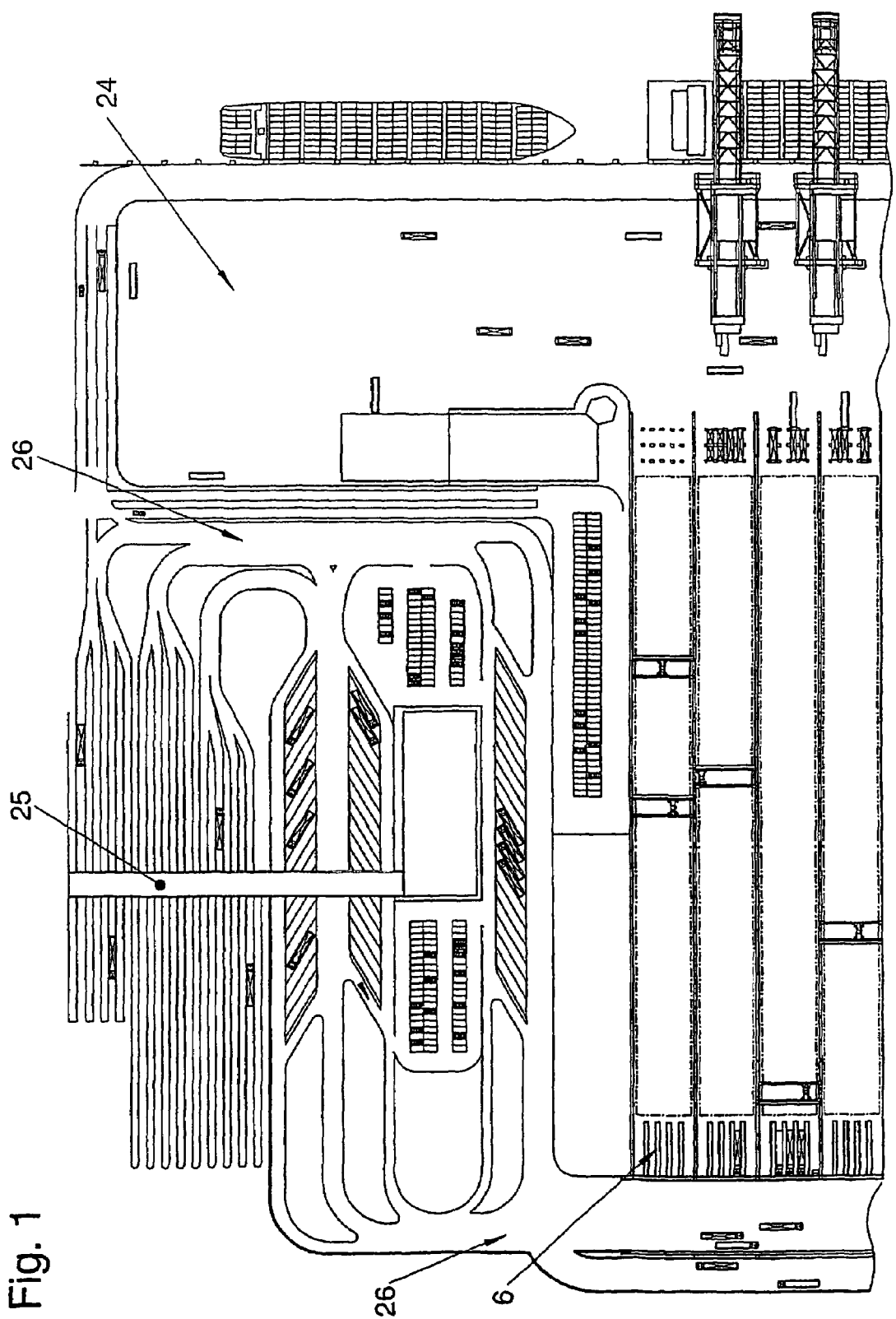
FIG. 1 is a top plan overview of a container handling yard.

FIG. 1 shows an automated container terminal 24 for containers 1, where trucks 7 (FIG. 2) are loaded and unloaded at the land side. In an identification zone 25, arriving and departing trucks 7 are identified and/or surveyed. An arriving truck 7 is identified and the data thus generated, which are required for the loading and unloading, are transmitted to the DP (data processing) system (not shown) for logistical management. After this, the truck 7 moves to the loading or unloading zone 6 by roadways 26.

Figure 2:
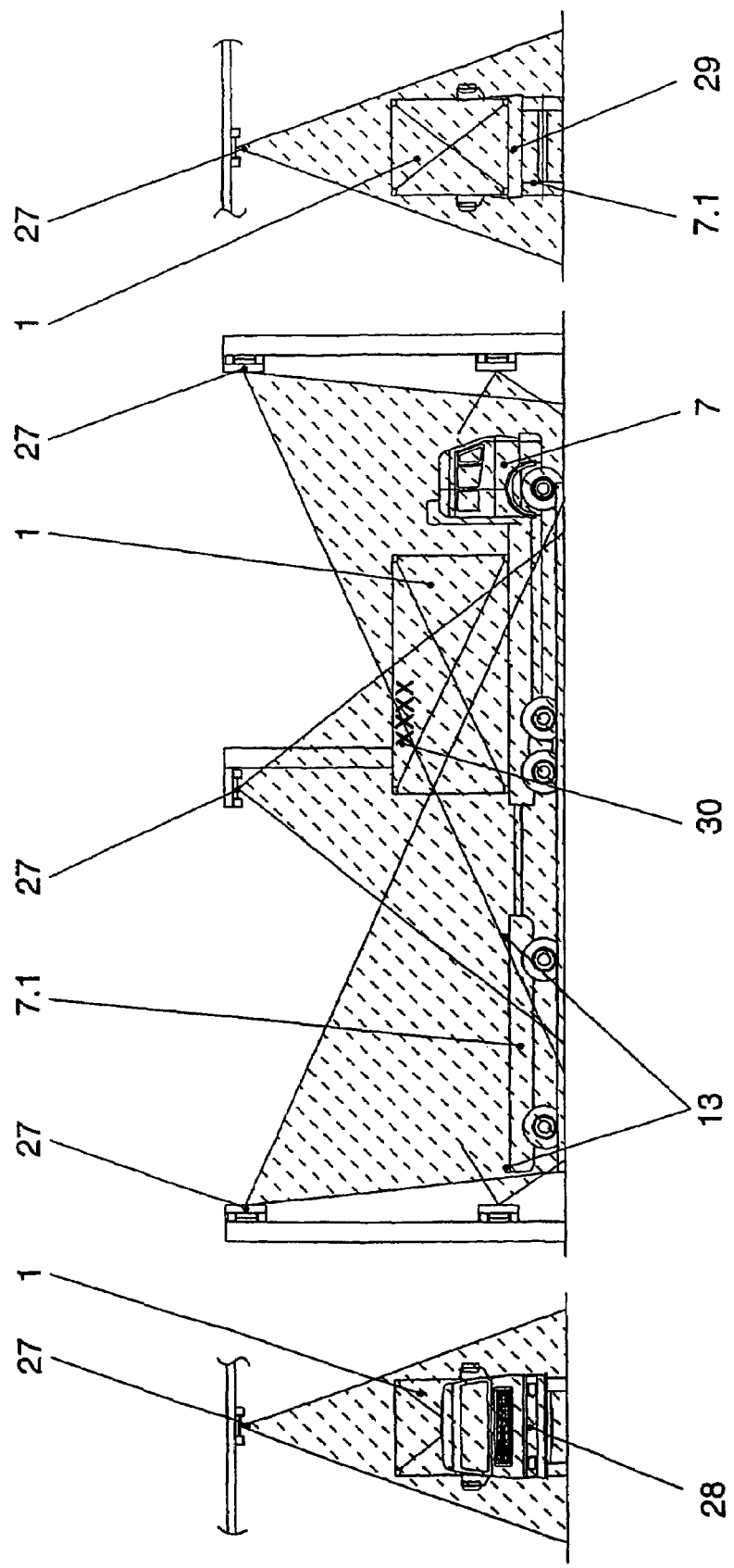
FIG. 2 is a side elevation of an identification zone for detection of transport vehicles.

FIG. 2 shows the cameras 27 arranged in the identification zone 25, which are used to detect the truck 7 from all sides. The license number 28 of the truck 7 and possibly the license number 29 of the trailer 7.1 are automatically detected by the cameras 27. Likewise, the identification number 30 of the container 1 will also be detected in the case of loaded trucks 7. All information regarding the truck 7, the trailer 7.1, and possibly the container 1 will be transmitted to the DP system of the logical management and be available in the system at all times and can be called up by an operator (not shown).

Figure 3:
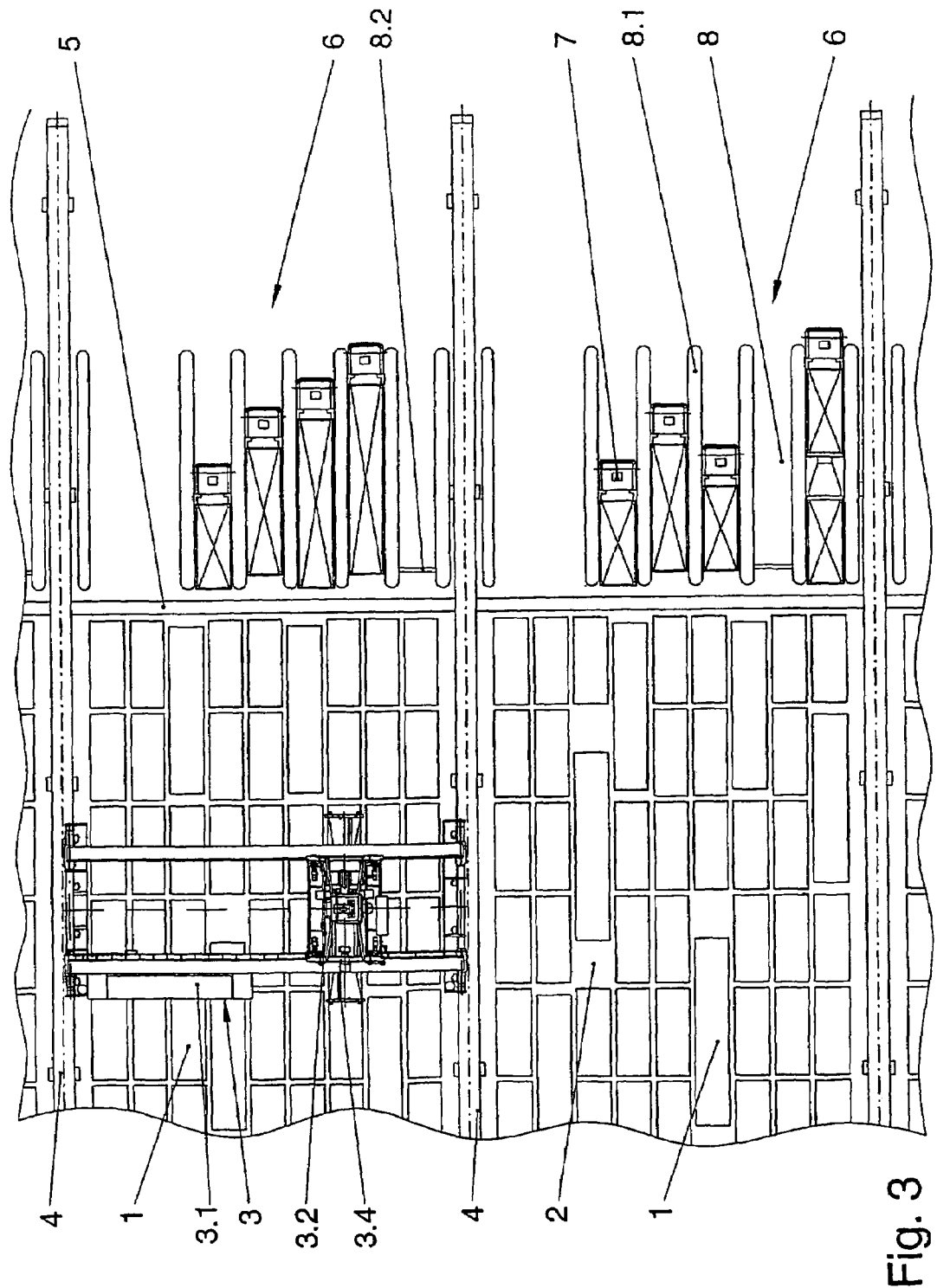
FIG. 3 is a top plan section of a container handling yard, container storage space and parking position.
Figure 4:
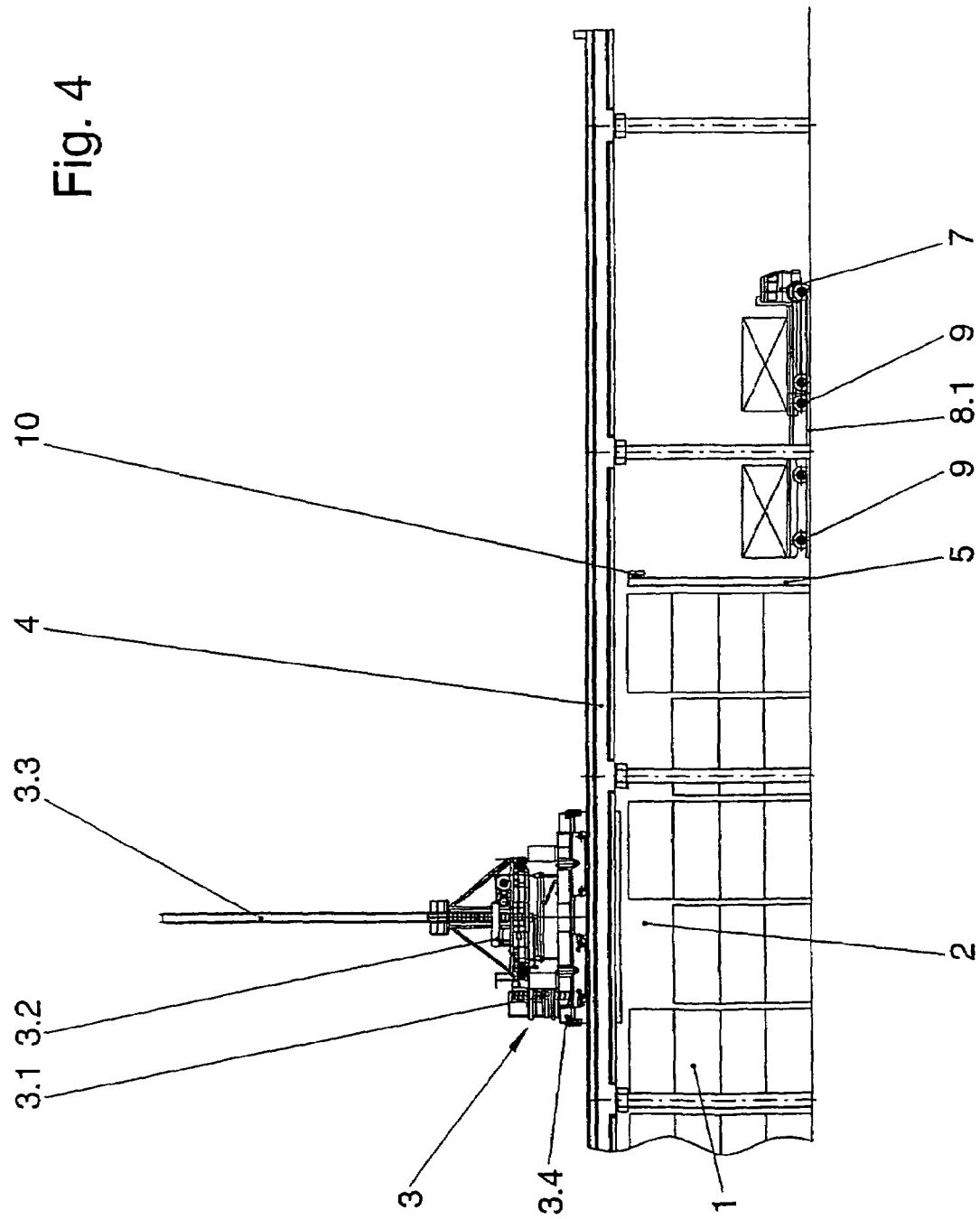
FIG. 4 is a side elevation of the area shown in FIG. 3.

In the automatic container storage space 2, as depicted in FIGS. 3 and 4, the containers 1 are kept in stacks. The automatic stacker crane 3 consists of a mobile trolley 3.2, which can travel on a bridge 3.1, while the bridge 3.1 can travel on the crane track 4. During the loading process, the container 1 is rigidly connected to the moveable mast 3.3 of the moveable trolley 3.2. On the mast 3.3 is situated the load suspension device 3.4 of the stacker crane 3, which accommodates the container. The automatic stacker crane 3 is coupled to the DP system of the logistical management and can thus reach every possible coordinate within the travel zone at any time. The coordinate system (not shown) describes a space which is reached by the load suspension device 3.4 of the automatic traveling stacker crane 3. In place of an ACS, one can also use gantry cranes or one-legged gantry cranes.

The automatic container storage space 2 is bounded off from the loading and unloading zone 6 by a border 5, which can be a fence or a wall. In the loading and unloading zone 6, the trucks 7 are each positioned in a parking position 8. FIGS. 3 and 4 show trucks 7 that have been backed into a parking position 8, which was assigned to them. The parking positions 8 have concrete gutters 8.1 at the sides, which facilitate the backing in of the trucks 7 when parking, since the wheels 9 of the truck 7 are guided in this way. The parking process is completed when the truck 7 backs up and its wheels 9 strike against the cross struts 8.2 bounding the parking position 8.

Figure 5:
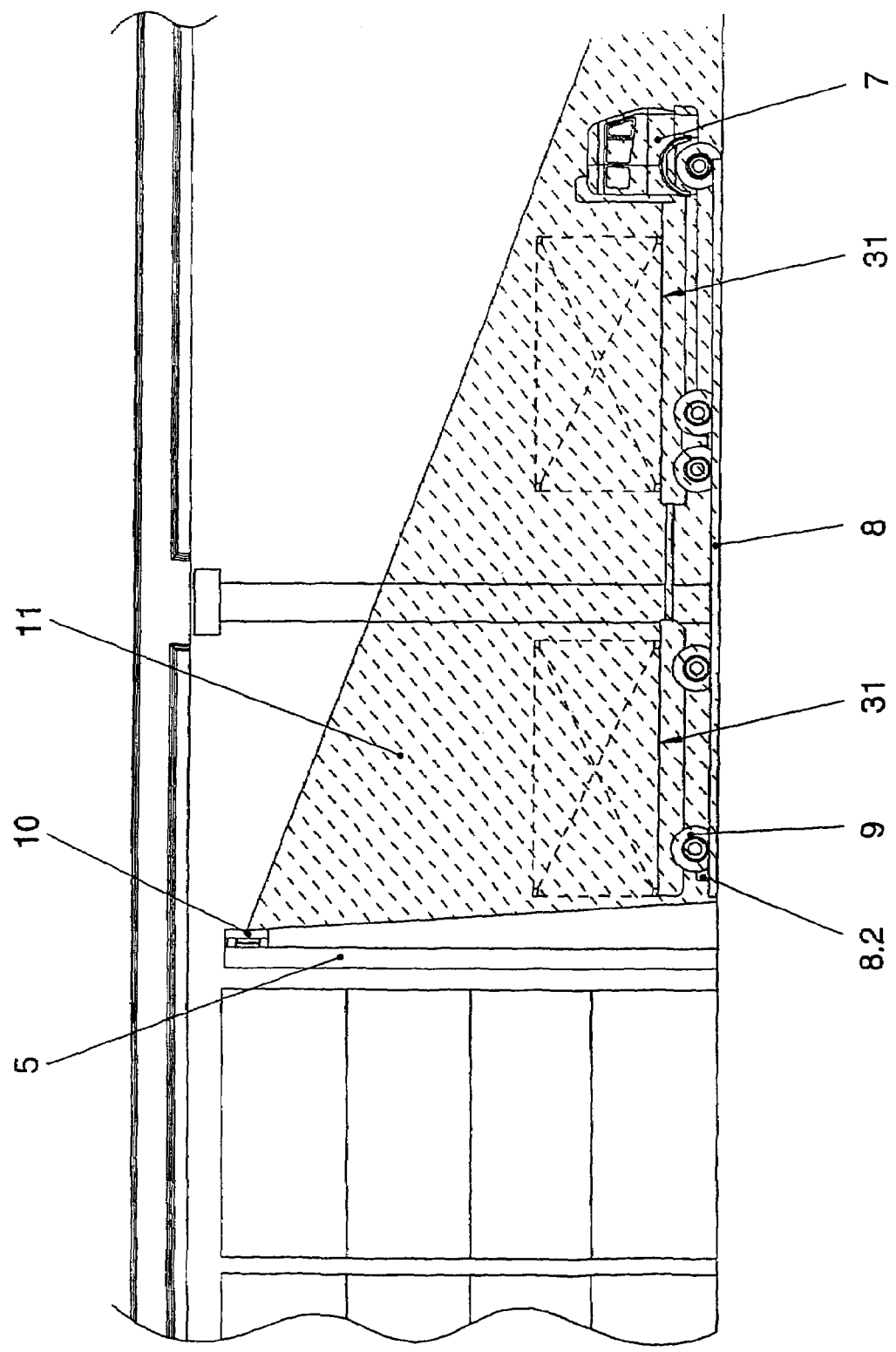
FIG. 5 is a side elevation representation of the viewing angle of the camera placed in the parking position.

Each parking position 8 is outfitted with a fixed and calibrated camera system 10, which is located above the boundary 5 (FIG. 5). The viewing angle 11 of the camera 10 is chosen so that all loading platforms 31 of the truck 7 and any containers 1 located thereupon are completely detected. Thanks to this viewing angle 11 of the camera 10, an operator at a monitor 12 (FIG. 6) can observe the parking process.

Figure 6:
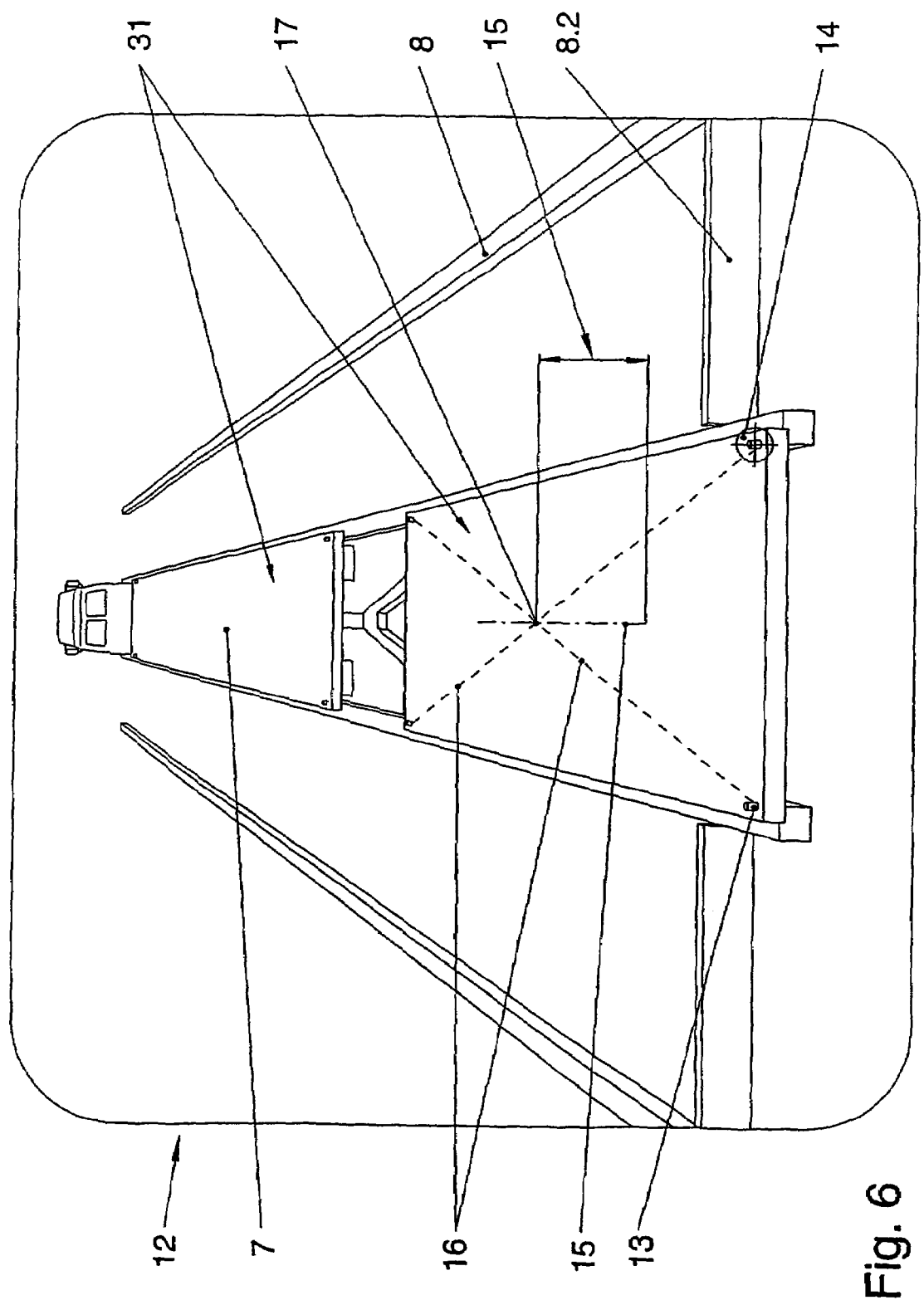
FIG. 6 is a view of first user-defined interface.

FIG. 6 shows the monitor 12 with the image of the camera 10, by which the operator can observe and control the parking process of the truck 7 and the loading and unloading process. For the loading of the truck 7 in the parking position 8, the position of the loading platform 31 of the truck 7 has to be measured. For this, a marking mechanism such as a crosshair 14 is superimposed on the image of the camera 10, with which the operator can select identification points. These identification points are the fasteners of the loading platform 31 of the truck 7, the so-called twist locks 13. The coordinates of the twist locks 13 are transmitted to the DP system of the logistical management in order to calculate the position coordinate of the loading platform 31. The DP system of the logistical management calculates the diagonals 16 of the twist locks 13 and their point of intersection 17. The intersection 17 describes the vertical position 15 of the loading platform in the system of coordinates. This computation is made possible by a previous calibration of the fixed installed camera 10, whose exact position and viewing direction is known.

Figure 7:
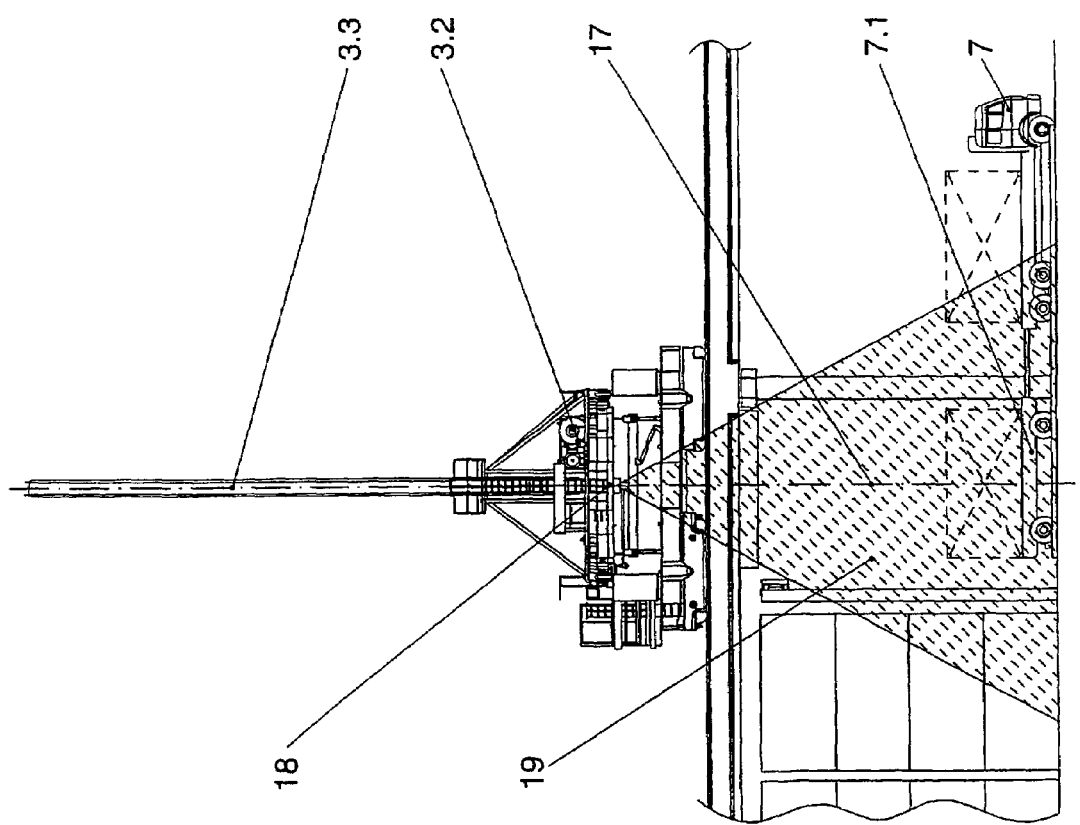
FIG. 7 is a side elevation representation of the viewing angle of the camera arranged on the side of the automatic container crane.
Figure 8:
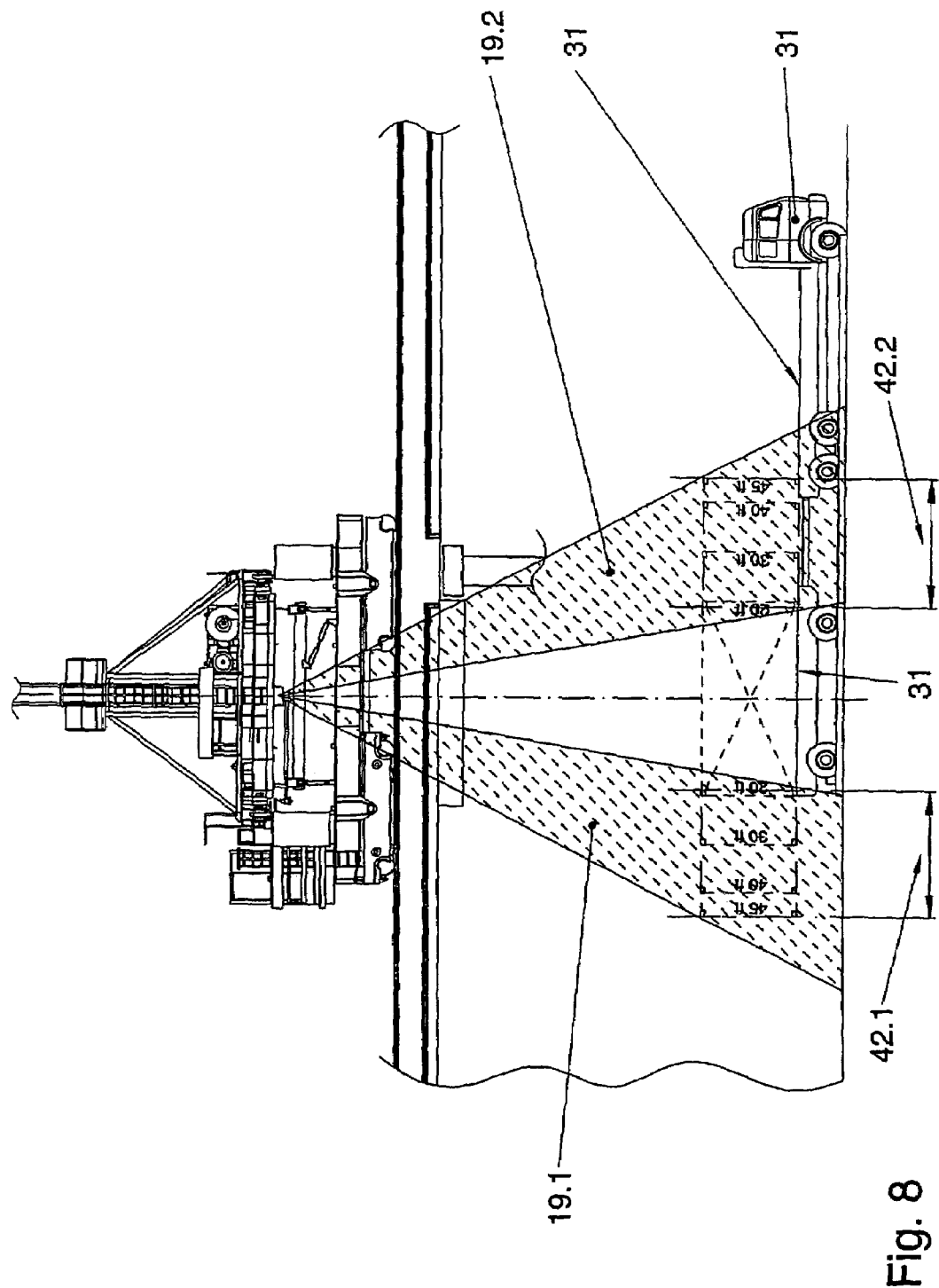
FIG. 8 is a side elevation representation of the viewing angle of the camera arranged on the side of the automatic container crane.

The container 1 located on the rigid mast 3.3 of the stacker crane 3, as depicted in FIG. 7, is positioned above the loading platform 31 of the truck 7 so that the point of intersection of the diagonals of the fastener of the container 1 stands congruently and plumb above the point of intersection 17 of the diagonals 16 of the fastener of the loading platform 31 of the truck 7. Thanks to the cameras 18 arranged on the stacker crane 3 and thanks to the chosen type of positioning of the container 1 being loaded above the loading platform 31, the viewing angle 19 of the camera 18 can be restricted, as depicted in FIG. 8. Due to the different container sizes of 20 ft., 30 ft., 40 ft. to 45 ft., two viewing angles 19.1 and 19.2 are required left and right, disregarding the middle zone of the container 1. In terms of the coordinates of the point of intersection 17 of the diagonals 16 of the loading platform 31, a viewing range of the camera system 42.1 from −7 m to −3 m and a viewing range of the camera system 42.2 from +3 m to +7 m is necessary. Only in these areas are there twist locks 13 of the loading platform 31 adapted to the container 1.

Figure 9:
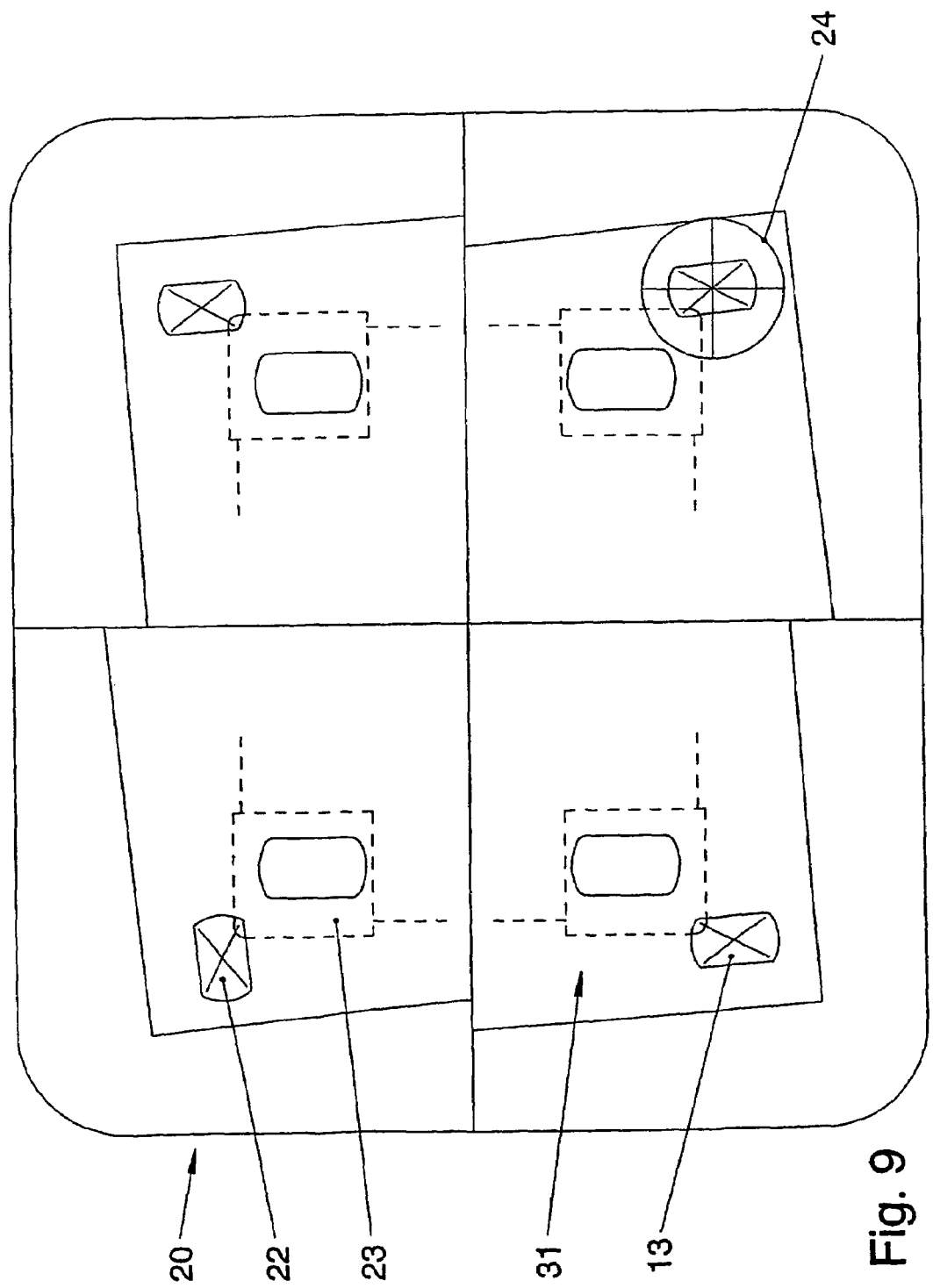
FIG. 9 is a view of a second user-defined interface, during a loading process.

FIG. 9 shows the four-part user-defined interface 20 of the DP system of the logistical management. Each quadrant shows one image segment, which is generated by at least one of the cameras 18 arranged on the side of the stacker crane 3. For redundancy reasons and reliability considerations, the four image segments can be generated from the image of a camera, or also from two images of two cameras arranged at the side. It is likewise possible to implement a solution that provides one camera for each image segment. Each image segment shows the fastener, the twist locks 13 of the loading platform 31. The operator can recognize a wrong position for the twist locks 22 and then use an intercom system to ask the driver of the truck 7 to correct this wrong position. The computer-calculated contours of the container 23 are superimposed on the image, showing the operator the actual position of the container 1. The orientation of the container 1 with respect to the loading platform 31 is accomplished by the operator using a marking mechanism, such as a crosshair 24, to once again select the fastener or twist locks 13 of the loading platform 31. The coordinates of the fastener of the loading platform 31 are once again transmitted to the DP system of the logistical management. The actual orientation of the loading platform 31 is calculated from this. Any deviation between the orientation of the container 1 and the orientation of the loading platform 31 is determined by the DP system of the logistical management and the container 1 is rotated on the mast 3.3 by means of the load suspension device 3.4 so that all fasteners of the container 1 stand congruently and plumb above the fasteners of the loading platform 31.

Figure 10:
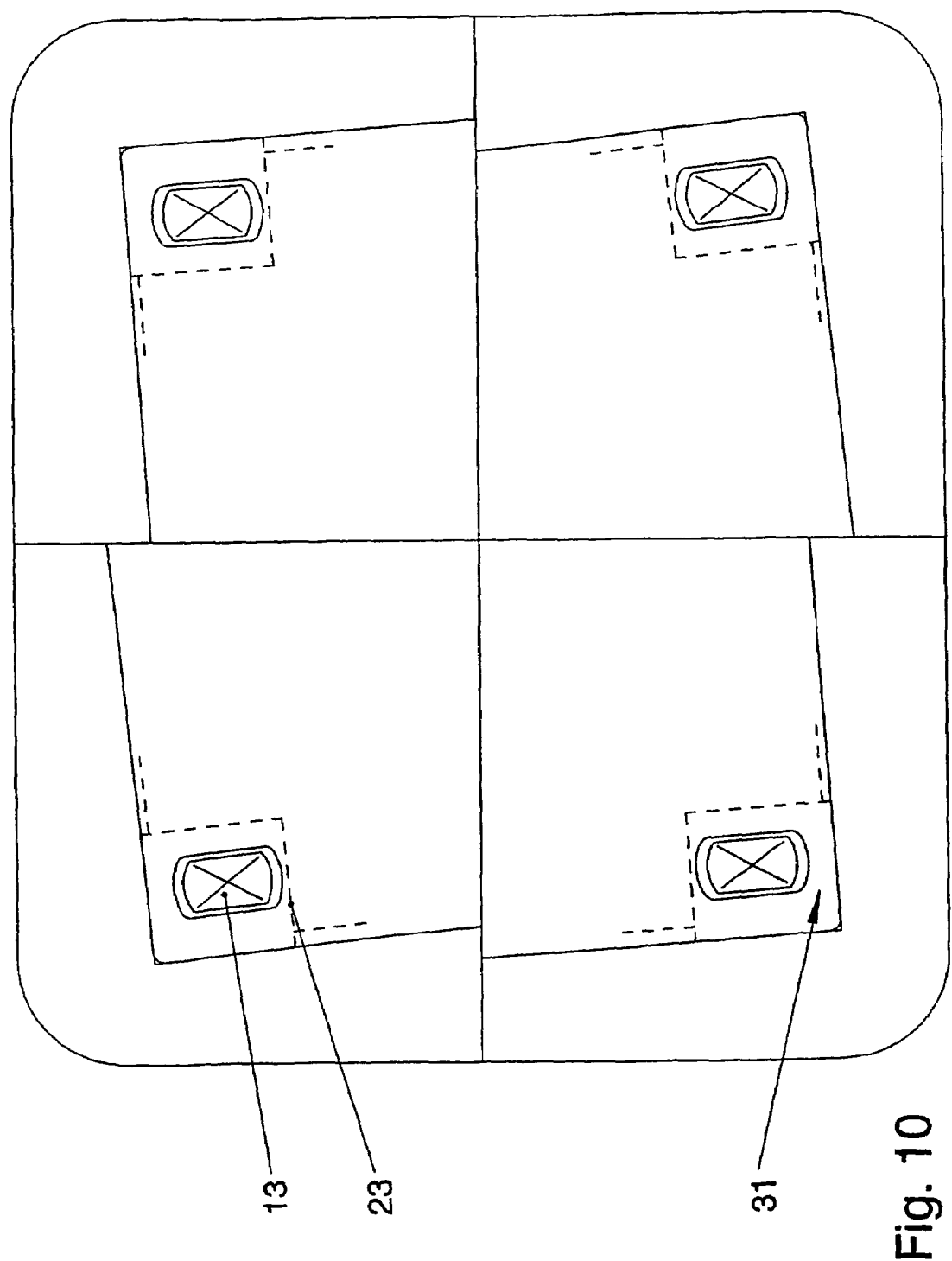
FIG. 10 is a view of a user-defined interface at the end of a loading process.

During the lowering process, the computer-calculated contour 23 of the container is newly calculated at any time and superimposed on the image frozen at the start of the lowering process, as represented in FIG. 10. At the end of the lowering process, the fasteners of the container 1 engage with the fasteners of the loading platform 31 of the truck 7. The operator watches and controls the loading process on the monitor as the container 1 is set down.

Figure 11:
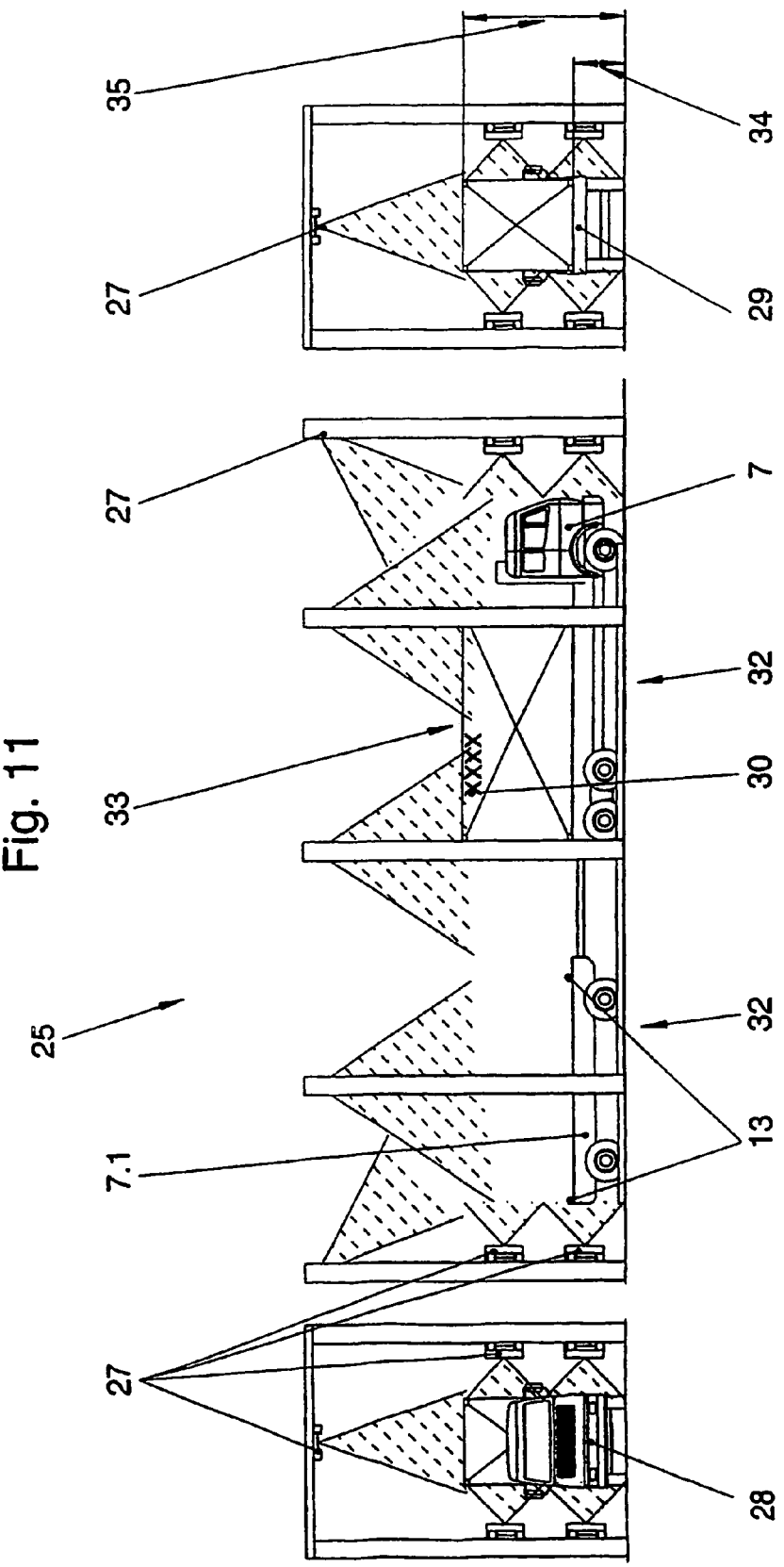
FIG. 11 is a side elevation another embodiment of an identification point.
Figure 12:
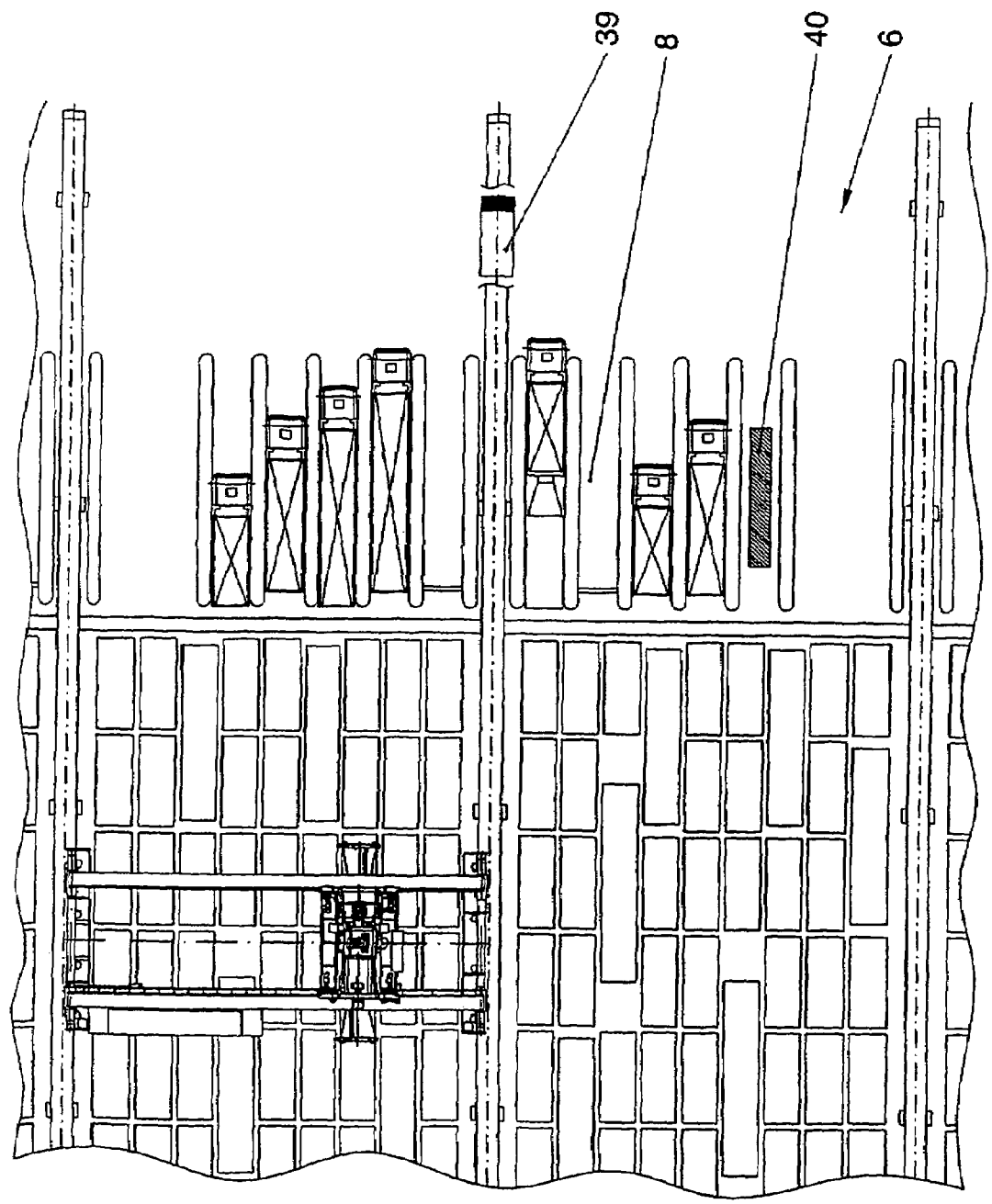
FIG. 12 is a top plan view of another section of a container handling yard, container storage space and parking position.
Figure 13:
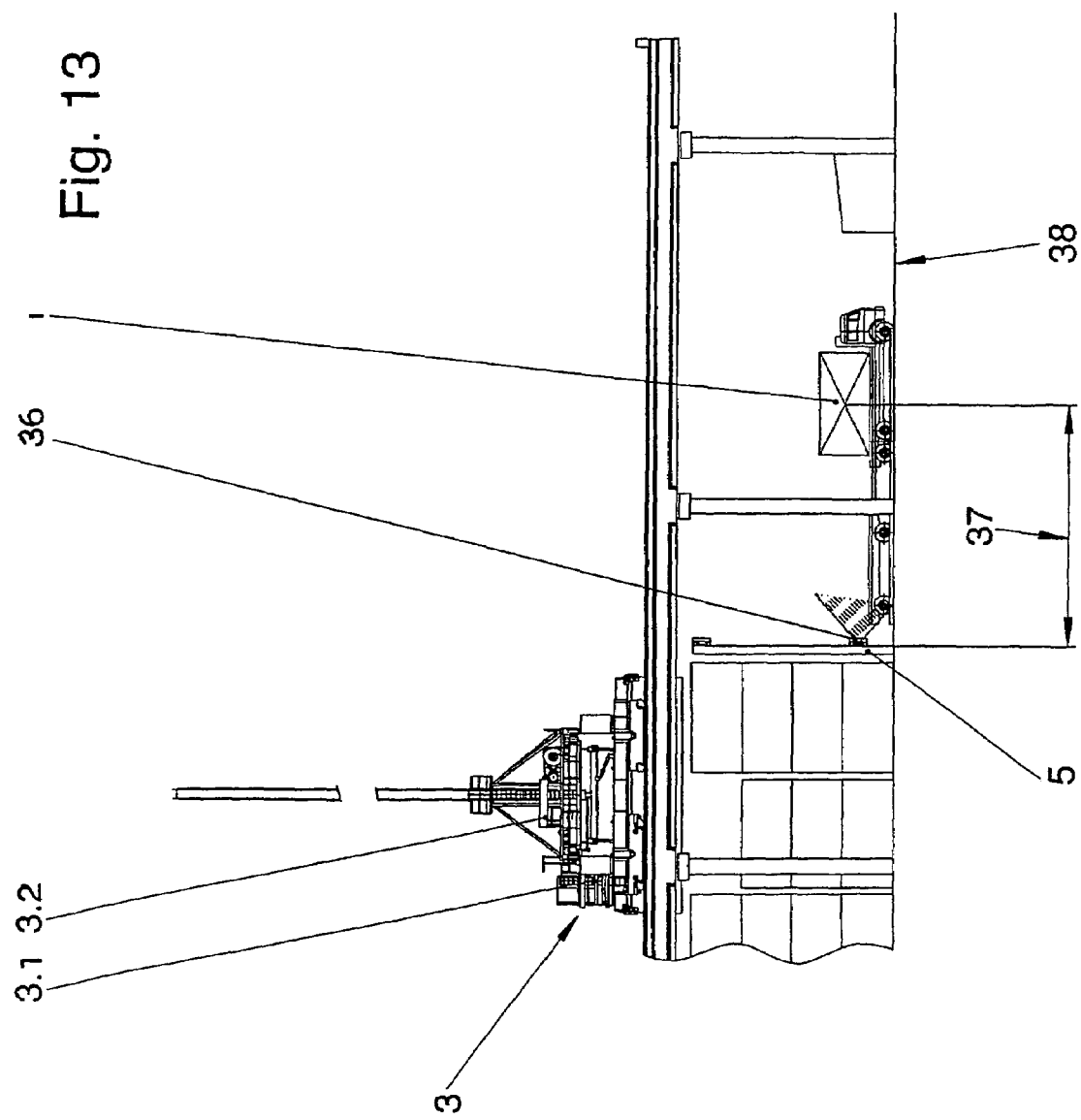
FIG. 13 is a side elevation of another representation of the viewing angle of the camera arranged in the parking position.

Another method for detecting the identification points of the loading platform 31 of a truck 7 or the identification points of a container 1 is shown by FIGS. 11 to 13. The known process steps of the previously described process are rearranged here.

FIG. 11 shows a modified identification zone 25, in which the arriving truck 7 including a possibly present container 1 is identified. The identification of the truck 7 involves the recognition of the license plate 28, 29 of the transport vehicles and the identification number 30 of the possibly present container 1 by means of the cameras 27 arranged at the identification zone 25, which are connected to the DP system of the logistical management and transmit the so-generated data to it. In addition to the work step described in FIG. 2, the possibly present container 1 and/or the empty loading platform 31 of the truck 7 are then measured. The truck 7 is detected from the side 32 and from above (top view) 33 by means of the camera 27. The detection of the identification points of the loading platform 31 (or container 1) as described in FIG. 6 does not occur in the loading and unloading zone 6, contrary to FIG. 6, but rather in the identification zone 25. The course of the detection of the identification points remains identical. At the same time, there is an automatic measuring of the height 34, 35 of the fastener being used by the camera 27. The coordinates found are transmitted to the DP system, and these represent the relative target position of the container being unloaded, since they pertain only to the truck 7. The driver of the truck 7, after a successful identification and measurement of the truck 7, receives an access authorization in the form of a magnetic card or chip card (not shown). The magnetic card also contains all relevant data concerning the handling order.

The driver drives the truck 7 to a loading and unloading zone 6 assigned to him (FIG. 12) and backs his transport vehicle up into any desired parking position 8 within the loading and unloading zone 6. During the parking process, as represented in FIG. 13, an object recognition is started in the DP system of the logistical management by means of a camera 36 arranged in the parking position 8, which identifies the truck 7 and also classifies it geometrically in the system of coordinates, not represented. The information from the camera 36 arranged at the border 5 allows the DP system of the logistical management to exactly recognize the truck 7 in terms of its identity and position: its distance 37 from the border 5, a left/right offset within the parking position 8 and angle of twist of the truck 7 relative to the ground 38. Thus, after completing the parking process, the exact position of the truck 7 is known to the DP system of the logistical management.

From these coordinates, and in conjunction with the relative target position of the container 1, the DP system of the logistical management can determine the position coordinate for the container 1 being loaded, which represents the absolute target coordinate for the container being loaded.

Next, the driver of the truck 7 goes to a reporting space 39, in order to signal with the magnetic card his readiness for loading or unloading of the truck 7. The DP system checks the data on the magnetic card against the data obtained from the parking position 8 of the truck and if they agree it, generates an order for the stacker crane 3. The stacker crane 3 picks up the container 1 to be loaded from the container storage space 2 and begins the loading of the truck 7 in accordance with the method described as of FIG. 7.

Furthermore, FIG. 12 shows a tolerance range 40. Within each parking position 8, the load suspension device 3.4 of the stacker crane 3 can only travel within this special tolerance range 40, for safety reasons.

Figure 14:
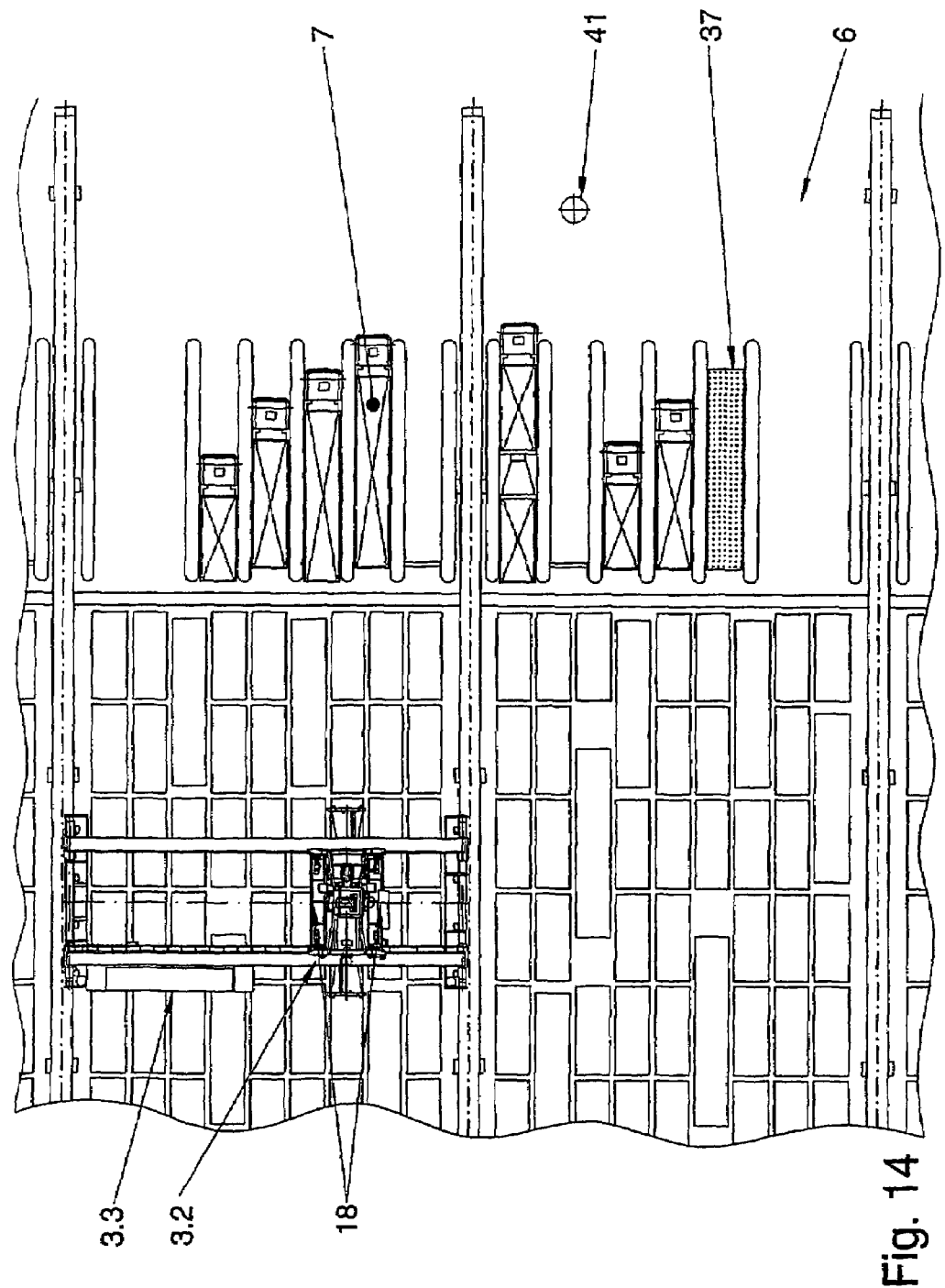
FIG. 14 is a top plan view of representation of the arrangement of a reference point.

FIG. 14 shows a container yard 2 with a reference point 41.

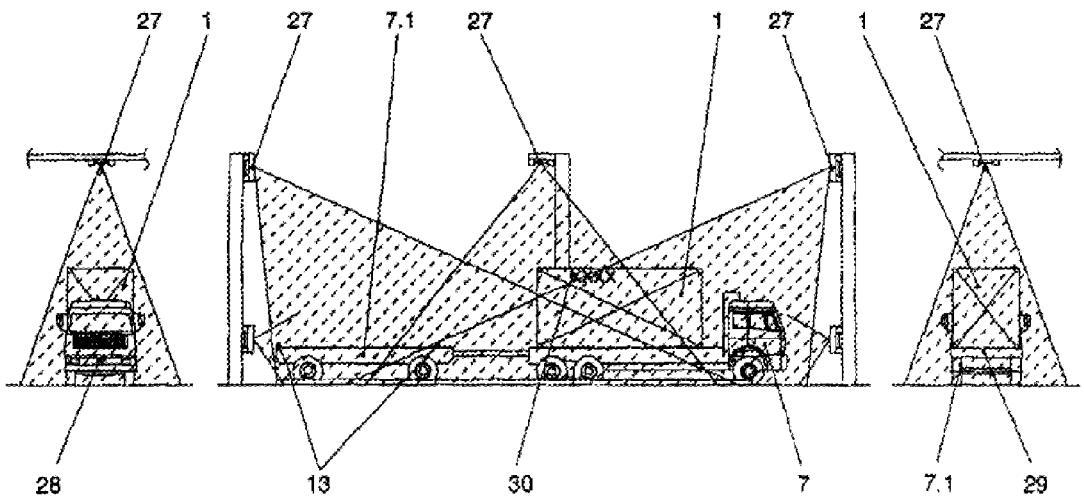

The invention claimed is:

1. Method for load transfer in a container storage space for standard containers, with a stacker crane for the containers servicing the container storage space, controllable by a logistical management data processing (DP) system, wherein the stacker crane can travel between a storage place for each container and a loading platform of a transport vehicle of a container that can travel in the area of the container storage space, wherein the stacker crane has a load suspension device for depositing the container on the loading platform and picking the container up from the loading platform, which can be oriented with respect to it, the method of loading and unloading the transport vehicle comprising:

a) identifying the transport vehicle and the container being unloaded and transferring the data generated in this way to the logistical management DP system, b) providing a calibrated camera system, detecting defined identification points on the loading platform of the transport vehicle and on the container with said camera system and transferring coordinates of the identification points to the logistical management DP system, c) comparing with the logistical management DP system the coordinates of the identification points against the data of the container being loaded as stored in the DP system and determining the fastener to be assigned to this container and position coordinates on the loading platform of the transport vehicle, d) driving the stacker crane under computer control with the container to be loaded above the loading platform of the transport vehicle, above the position coordinate, wherein the position coordinate is defined by the vertical position of the loading platform and by the point of intersection of the diagonals of the identification points of the loading platform, wherein the position coordinate describes the target position of the container, e) providing a calibrated camera system arranged on the trolley of the stacker crane, detecting the fastener of the loading platform and selectively moving the container so that the fastener of the container is positioned above the coordinated fastener of the loading platform, f) setting down the container on the loading platform of the transport vehicle such that the fastener of the container and the coordinated fastener of the loading platform mate together at the end of the setdown process, g) determining with the logistical management DP system, from the identification points, the fastener and position coordinate of the container, h) driving the stacker crane under computer control above the container, above the position coordinate, while the position coordinate is described by the vertical position of the upper edge of the identification points of the container and by the point of intersection of the diagonals of the identification points of the container, which describes the absolute target position of the load suspension device, i) detecting the fastener of the loading platform of the container and selectively moving the load suspension device so that the fastener of the load suspension device of the stacker crane stands above the coordinated fastener of the container, and j) bringing the load suspension means up to the container such that the fastener of the load suspension means and the fastener of the container mate together.

2. Method according to claim 1, wherein the transport vehicle or the container being unloaded is identified by means of a camera system.

3. Method according to claim 2, wherein said detecting the coordinates of the identification points of the loading platform or the identification points of the container comprises providing a user-defined interface on a monitor screen of the logistical management DP system, and selecting by an operator of the identification points of the loading platform or the identification points of the container with a marking mechanism on the user-defined interface.

4. Method according to claim 3, including automatically detecting the coordinates of the identification points of the loading platform or the identification points of the container by a computer system and transferring the coordinates to the logistical management DP system.

5. Method according to claim 4, wherein said automatically detecting of the coordinates of the loading platform of the transport vehicle occurs in its loading and unloading zone and that of the coordinates of the loading platform of the container occurs in its loading and unloading zone.

6. Method according to claim 5, wherein the vertical position of the loading platform and the point of intersection of the diagonals of the identification points of the loading platform or the vertical position of the upper edge of the identification points of the container and the point of intersection of the diagonals of the identification points of the container describe the relative target position of the container.

7. Method according to claim 6, wherein the position coordinate is described by the absolute target position of the container or of the load suspension device, which is composed of the coordinates of the transport vehicle located in the parking position as detected by means of a camera and the relative target position of the container or of the load suspension device.

8. Method according to claim 7, including moving the stacker crane into reach of the loading platform or of the container in such a way that the point of intersection of the diagonals of the fastener of the container or the load suspension device stands plumb above the point of intersection of the diagonals of the fastener of the loading platform or the container.

9. Method according to claim 8, including providing a second user-defined interface, said second user defined interface having four quadrants, each representing a pair of fasteners, and each pair consists of one fastener of the loading platform or of the container, projected by an image of the camera system, and of the coordinated fastener of the container or the load suspension device, projected by a superimposing of a computer-calculated contour of the container or of the load suspension means and of the fastener of the container or of the load suspension means onto the image.

10. Method according to claim 9, including determining any deviation in position of the container being loaded from the position of the loading platform or the position of the load suspension device from the position of the container being unloaded in the logistical management DP system for a fine-tuned positioning, by providing the second user-defined interface of logistical management with a second marking mechanism, wherein the operator selects at least one identification point of the loading platform or of the container with said second marking mechanism.

11. Method according to claim 10, including providing a fine positioning computer system and automatically recognizing any deviation in position of the container being loaded from the position of the loading platform or in the position of the load suspension device from the position of the container being unloaded with said fine positioning computer system.

12. Method according to claim 11, wherein a deviation in position of the container being loaded from the position of the loading platform of the container or in the position of the load suspension device from the container being unloaded, the load suspension device is rotated so that the fastener of the container stands plumb above the fastener of the loading platform, or the fastener of the load suspension device stands plumb above the fastener of the container.

13. Method according to claim 12, including setting down and releasing of the container from the load suspension device or the setting down of the load suspension device of the stacker crane onto the container by the operator until the fasteners mate with each other.

14. Method according to claim 13, including adjusting the position of a stacker crane in a container storage space, said adjusting the position comprising providing a camera system having at least one calibrated camera fastened on the trolley of the stacker crane for detection of the position of containers being handled, with an absolute length measuring system to detect the position of the stacker crane, positioning the stacker crane travels above a reference point arranged at any given position within the container yard, so that said at least one calibrated camera of the camera system detects the reference point, and comparing the position of the reference point with the memorized position of the reference point with the logical management DP system and determining an offset when a deviation exists.

15. Method according to claim 14, characterized in that the container yard has several reference points, which can be detected by the cameras of the stacker crane.

16. Method according to claim 15 for adjusting the position of the at least one calibrated camera, which is arranged on the stacker crane including defining an absolute length measuring system for detecting the position of the stacker crane, characterized in that the container yard has a super-reference point and said at least one calibrated camera is arranged on the stacker crane that can be adjusted relative to it by means of the super-reference point.

17. Method according to claim 1, wherein said detecting the coordinates of the identification points of the loading platform or the identification points of the container comprises providing a user-defined interface on a monitor screen of the logistical management DP system, and selecting by an operator of the identification points of the loading platform or the identification points of the container with a marking mechanism on the user-defined interface.

18. Method according to claim 1, including automatically detecting the coordinates of the identification points of the loading platform or the identification points of the container by a computer system and transferring the coordinates to the logistical management DP system.

19. Method according to claim 1, wherein said automatically detecting of the coordinates of the loading platform of the transport vehicle occurs in its loading and unloading zone and that of the coordinates of the loading platform of the container occurs in its loading and unloading zone.

20. Method according to claim 1, wherein the vertical position of the loading platform and the point of intersection of the diagonals of the identification points of the loading platform or the vertical position of the upper edge of the identification points of the container and the point of intersection of the diagonals of the identification points of the container describe the relative target position of the container.

21. Method according to claim 1, wherein the position coordinate is described by the absolute target position of the container or of the load suspension device, which is composed of the coordinates of the transport vehicle located in the parking position as detected by means of a camera and the relative target position of the container or of the load suspension device.

22. Method according to claim 1, including moving the stacker crane into reach of the loading platform or of the container in such a way that the point of intersection of the diagonals of the fastener of the container or the load suspension device stands plumb above the point of intersection of the diagonals of the fastener of the loading platform or the container.

23. Method according to claim 1, including providing a second user-defined interface, said second user defined interface having four quadrants, each representing a pair of fasteners, and each pair consists of one fastener of the loading platform or of the container, projected by an image of the camera system, and of the coordinated fastener of the container or the load suspension device, projected by a superimposing of a computer-calculated contour of the container or of the load suspension means and of the fastener of the container or of the load suspension means onto the image.

24. Method according to claim 1, including determining any deviation in position of the container being loaded from the position of the loading platform or the position of the load suspension device from the position of the container being unloaded in the logistical management DP system for a fine-tuned positioning, by providing the second user-defined interface of logistical management with a second marking mechanism, wherein the operator selects at least one identification point of the loading platform or of the container with said second marking mechanism.

25. Method according to claim 1, including providing a fine positioning computer system and automatically recognizing any deviation in position of the container being loaded from the position of the loading platform or in the position of the load suspension device from the position of the container being unloaded with said fine positioning computer system.

26. Method according to claim 1, wherein a deviation in position of the container being loaded from the position of the loading platform of the container or in the position of the load suspension device from the container being unloaded, the load suspension device is rotated so that the fastener of the container stands plumb above the fastener of the loading platform, or the fastener of the load suspension device stands plumb above the fastener of the container.

27. Method according to claim 1, including setting down and releasing of the container from the load suspension device or the setting down of the load suspension device of the stacker crane onto the container by the operator until the fasteners mate with each other.

28. Method according to claim 1, including adjusting the position of a stacker crane in a container storage space, said adjusting the position comprising providing a camera system having at least one calibrated camera fastened on the trolley of the stacker crane for detection of the position of containers being handled, with an absolute length measuring system to detect the position of the stacker crane, positioning the stacker crane travels above a reference point arranged at any given position within the container yard, so that said at least one calibrated camera of the camera system detects the reference point, and comparing the position of the reference point with the memorized position of the reference point with the logical management DP system and determining an offset when a deviation exists.

29. Method according to claim 28, characterized in that the container yard has several reference points, which can be detected by the cameras of the stacker crane.

30. Method according to claim 1 for adjusting the position of the at least one calibrated camera, which is arranged on the stacker crane including defining an absolute length measuring system for detecting the position of the stacker crane, characterized in that the container yard has a super-reference point and said at least one calibrated camera is arranged on the stacker crane that can be adjusted relative to it by means of the super-reference point.

31. The method of claim 1, wherein the method of loading the transport vehicle comprises:
   a) identifying the transport vehicle and transferring the data generated in this way to the logistical management DP system,
   b) providing a calibrated camera system, detecting defined identification points on the loading platform of the transport vehicle with said camera system and transferring coordinates of the identification points to the logistical management DP system,
   c) comparing with the logistical management DP system the coordinates of the identification points against the data of the container being loaded as stored in the DP system and determining the fastener to be assigned to this container and position coordinates on the loading platform of the transport vehicle,
   d) driving the stacker crane under computer control with the container to be loaded above the loading platform of the transport vehicle, above the position coordinate, wherein the position coordinate is defined by the vertical position of the loading platform and by the point of intersection of the diagonals of the identification points of the loading platform, wherein the position coordinate describes the target position of the container,
   e) providing a calibrated camera system arranged on the trolley of the stacker crane, detecting the fastener of the loading platform and selectively moving the container so that the fastener of the container is positioned above the coordinated fastener of the loading platform, f) setting down the container on the loading platform of the transport vehicle such that the fastener of the container and the coordinated fastener of the loading platform mate together at the end of the setdown process.

* * * * *

UNITED STATES PATENT AND TRADEMARK OFFICE
CERTIFICATE OF CORRECTION

| | | |
|---|---|---|
| PATENT NO. | : 7,415,320 B2 | |
| APPLICATION NO. | : 10/506460 | |
| DATED | : August 19, 2008 | |
| INVENTOR(S) | : Jannis Moutsokapas | |

It is certified that error appears in the above-identified patent and that said Letters Patent is hereby corrected as shown below:

<u>Column 18:</u>
Line 4, Insert missing Claims 32-65

--32. The method of claim 1, wherein the method of unloading the transport vehicle comprises:

a) identifying the transport vehicle and the container being unloaded and transferring the data generated in this way to the logistical management DP system, b) providing a calibrated camera system, detecting defined identification points of the container with said camera system and transferring coordinates of the identification points to the logistical management DP system, c) determining with the logistical management DP system, from the identification points, the fastener and position coordinate of the container, d) driving the stacker crane under computer control above the container, above the position coordinate, while the position coordinate is described by the vertical position of the upper edge of the identification points of the container and by the point of intersection of the diagonals of the identification points of the container, which describes the absolute target position of the load suspension device, e) providing a calibrated camera system arranged on the trolley of the stacker crane, detecting the fastener of the loading platform of the container and selectively moving the load suspension device so that the fastener of the load suspension device of the stacker crane stands above the coordinated fastener of the container, f) bringing the load suspension means up to the container such that the fastener of the load suspension means and the fastener of the container mate together.

33. Method according to claim 32, wherein the transport vehicle or the container being unloaded is identified by means of a camera system.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

34. Method according to claim 33, wherein said detecting the coordinates of the identification points of the loading platform or the identification points of the container comprises providing a user-defined interface on a monitor screen of the logistical management DP system, and selecting by an operator of the identification points of the loading platform or the identification points of the container with a marking mechanism on the user-defined interface.

35. Method according to claim 34, including automatically detecting the coordinates of the identification points of the loading platform or the identification points of the container by a computer system and transferring the coordinates to the logistical management DP system.

36. Method according to claim 35, wherein said automatically detecting of the coordinates of the loading platform of the transport vehicle occurs in its loading and unloading zone and that of the coordinates of the loading platform of the container occurs in its loading and unloading zone.

37. Method according to claim 35, wherein the automatically detecting of the coordinates of the loading platform of the transport vehicle or the coordinates of the container occurs in the identification zone.

38. Method according to claim 37, wherein the vertical position of the loading platform and the point of intersection of the diagonals of the identification points of the loading platform or the vertical position of the upper edge of the identification points of the container and the point of intersection of the diagonals of the identification points of the container describe the relative target position of the container.

39. Method according to claim 38, wherein the position coordinate is described by the absolute target position of the container or of the load suspension device, which is composed of the coordinates of the transport vehicle located in the parking position as detected by means of a camera and the relative target position of the container or of the load suspension device.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

40. Method according to claim 39, including moving the stacker crane into reach of the loading platform or of the container in such a way that the point of intersection of the diagonals of the fastener of the container or the load suspension device stands plumb above the point of intersection of the diagonals of the fastener of the loading platform or the container.

41. Method according to claim 40, including providing a second user-defined interface, said second user defined interface having four quadrants, each representing a pair of fasteners, and each pair consists of one fastener of the loading platform or of the container, projected by an image of the camera system, and of the coordinated fastener of the container or the load suspension device, projected by a superimposing of a computer-calculated contour of the container or of the load suspension means and of the fastener of the container or of the load suspension means onto the image.

42. Method according to claim 41, including determining any deviation in position of the container being loaded from the position of the loading platform or the position of the load suspension device from the position of the container being unloaded in the logistical management DP system for a fine-tuned positioning, by providing the second user-defined interface of logistical management with a second marking mechanism, wherein the operator selects at least one identification point of the loading platform or of the container with said second marking mechanism.

43. Method according to claim 42, including providing a fine positioning computer system and automatically recognizing any deviation in position of the container being loaded from the position of the loading platform or in the position of the load suspension device from the position of the container being unloaded with said fine positioning computer system.

44. Method according to claim 43, wherein a deviation in position of the container being loaded from the position of the loading platform of the container or in the position of the load suspension device from the container being unloaded, the load suspension device is rotated so that the fastener of the container stands plumb above the fastener of the loading platform, or the fastener of the load suspension device stands plumb above the fastener of the container.

UNITED STATES PATENT AND TRADEMARK OFFICE
CERTIFICATE OF CORRECTION

| | | |
|---|---|---|
| PATENT NO. | : 7,415,320 B2 | |
| APPLICATION NO. | : 10/506460 | |
| DATED | : August 19, 2008 | |
| INVENTOR(S) | : Jannis Moutsokapas | |

It is certified that error appears in the above-identified patent and that said Letters Patent is hereby corrected as shown below:

45. Method according to claim 44, including setting down and releasing of the container from the load suspension device or the setting down of the load suspension device of the stacker crane onto the container by the operator until the fasteners mate with each other.

46. Method according to claim 45, including adjusting the position of a stacker crane in a container storage space, said adjusting the position comprising providing a camera system having at least one calibrated camera fastened on the trolley of the stacker crane for detection of the position of containers being handled, with an absolute length measuring system to detect the position of the stacker crane, positioning the stacker crane travels above a reference point arranged at any given position within the container yard, so that said at least one calibrated camera of the camera system detects the reference point, and comparing the position of the reference point with the memorized position of the reference point with the logical management DP system and determining an offset when a deviation exists.

47. Method according to claim 46, characterized in that the container yard has several reference points, which can be detected by the cameras of the stacker crane.

48. Method according to claim 45 for adjusting the position of the at least one calibrated camera, which is arranged on the stacker crane including defining an absolute length measuring system for detecting the position of the stacker crane, characterized in that the container yard has a super-reference point and said at least one calibrated camera is arranged on the stacker crane that can be adjusted relative to it by means of the super-reference point.

49. Method according to claim 4, wherein the automatically detecting of the coordinates of the loading platform of the transport vehicle or the coordinates of the container occurs in the identification zone.

50. Method according to claim 1, wherein the automatically detecting of the coordinates of the loading platform of the transport vehicle or the coordinates of the container occurs in the identification zone.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

51. Method according to claim 32, wherein said detecting the coordinates of the identification points of the loading platform or the identification points of the container comprises providing a user-defined interface on a monitor screen of the logistical management DP system, and selecting by an operator of the identification points of the loading platform or the identification points of the container with a marking mechanism on the user-defined interface.

52. Method according to claim 32, including automatically detecting the coordinates of the identification points of the loading platform or the identification points of the container by a computer system and transferring the coordinates to the logistical management DP system.

53. Method according to claim 32, wherein said automatically detecting of the coordinates of the loading platform of the transport vehicle occurs in its loading and unloading zone and that of the coordinates of the loading platform of the container occurs in its loading and unloading zone.

54. Method according to claim 32, wherein the automatically detecting of the coordinates of the loading platform of the transport vehicle or the coordinates of the container occurs in the identification zone.

55. Method according to claim 32, wherein the vertical position of the loading platform and the point of intersection of the diagonals of the identification points of the loading platform or the vertical position of the upper edge of the identification points of the container and the point of intersection of the diagonals of the identification points of the container describe the relative target position of the container.

56. Method according to claim 32, wherein the position coordinate is described by the absolute target position of the container or of the load suspension device, which is composed of the coordinates of the transport vehicle located in the parking position as detected by means of a camera and the relative target position of the container or of the load suspension device.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

57. Method according to claim 32, including moving the stacker crane into reach of the loading platform or of the container in such a way that the point of intersection of the diagonals of the fastener of the container or the load suspension device stands plumb above the point of intersection of the diagonals of the fastener of the loading platform or the container.

58. Method according to claim 32, including providing a second user-defined interface, said second user defined interface having four quadrants, each representing a pair of fasteners, and each pair consists of one fastener of the loading platform or of the container, projected by an image of the camera system, and of the coordinated fastener of the container or the load suspension device, projected by a superimposing of a computer-calculated contour of the container or of the load suspension means and of the fastener of the container or of the load suspension means onto the image.

59. Method according to claim 32, including determining any deviation in position of the container being loaded from the position of the loading platform or the position of the load suspension device from the position of the container being unloaded in the logistical management DP system for a fine-tuned positioning, by providing the second user-defined interface of logistical management with a second marking mechanism, wherein the operator selects at least one identification point of the loading platform or of the container with said second marking mechanism.

60. Method according to claim 32, including providing a fine positioning computer system and automatically recognizing any deviation in position of the container being loaded from the position of the loading platform or in the position of the load suspension device from the position of the container being unloaded with said fine positioning computer system.

61. Method according to claim 32, wherein a deviation in position of the container being loaded from the position of the loading platform of the container or in the position of the load suspension device from the container being unloaded, the load suspension device is rotated so that the fastener of the container stands plumb above the fastener of the loading platform, or the fastener of the load suspension device stands plumb above the fastener of the container.

UNITED STATES PATENT AND TRADEMARK OFFICE
CERTIFICATE OF CORRECTION

PATENT NO. : 7,415,320 B2
APPLICATION NO. : 10/506460
DATED : August 19, 2008
INVENTOR(S) : Jannis Moutsokapas It is certified that error appears in the above-identified patent and that said Letters Patent is hereby corrected as shown below:

62. Method according to claim 32, including setting down and releasing of the container from the load suspension device or the setting down of the load suspension device of the stacker crane onto the container by the operator until the fasteners mate with each other.

63. Method according to claim 32, including adjusting the position of a stacker crane in a container storage space, said adjusting the position comprising providing a camera system having at least one calibrated camera fastened on the trolley of the stacker crane for detection of the position of containers being handled, with an absolute length measuring system to detect the position of the stacker crane, positioning the stacker crane travels above a reference point arranged at any given position within the container yard, so that said at least one calibrated camera of the camera system detects the reference point, and comparing the position of the reference point with the memorized position of the reference point with the logical management DP system and determining an offset when a deviation exists.

64. Method according to claim 63, characterized in that the container yard has several reference points, which can be detected by the cameras of the stacker crane.

65. Method according to claim 32 for adjusting the position of the at least one calibrated camera, which is arranged on the stacker crane including defining an absolute length measuring system for detecting the position of the stacker crane, characterized in that the container yard has a super-reference point and said at least one calibrated camera is arranged on the stacker crane that can be adjusted relative to it by means of the super-reference point.--

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| PATENT NO. | : 7,415,320 B2 |
|---|---|
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

Delete the title page and substitute therefor the attached title page.

Column 18:
Line 4, Insert missing Claims 32-65

--32. The method of claim 1, wherein the method of unloading the transport vehicle comprises:

a) identifying the transport vehicle and the container being unloaded and transferring the data generated in this way to the logistical management DP system, b) providing a calibrated camera system, detecting defined identification points of the container with said camera system and transferring coordinates of the identification points to the logistical management DP system, c) determining with the logistical management DP system, from the identification points, the fastener and position coordinate of the container, d) driving the stacker crane under computer control above the container, above the position coordinate, while the position coordinate is described by the vertical position of the upper edge of the identification points of the container and by the point of intersection of the diagonals of the identification points of the container, which describes the absolute target position of the load suspension device, e) providing a calibrated camera system arranged on the trolley of the stacker crane, detecting the fastener of the loading platform of the container and selectively moving the load suspension device so that the fastener of the load suspension device of the stacker crane stands above the coordinated fastener of the container, f) bringing the load suspension means up to the container such that the fastener of the load suspension means and the fastener of the container mate together.

33. Method according to claim 32, wherein the transport vehicle or the container being unloaded is identified by means of a camera system.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

34. Method according to claim 33, wherein said detecting the coordinates of the identification points of the loading platform or the identification points of the container comprises providing a user-defined interface on a monitor screen of the logistical management DP system, and selecting by an operator of the identification points of the loading platform or the identification points of the container with a marking mechanism on the user-defined interface.

35. Method according to claim 34, including automatically detecting the coordinates of the identification points of the loading platform or the identification points of the container by a computer system and transferring the coordinates to the logistical management DP system.

36. Method according to claim 35, wherein said automatically detecting of the coordinates of the loading platform of the transport vehicle occurs in its loading and unloading zone and that of the coordinates of the loading platform of the container occurs in its loading and unloading zone.

37. Method according to claim 35, wherein the automatically detecting of the coordinates of the loading platform of the transport vehicle or the coordinates of the container occurs in the identification zone.

38. Method according to claim 37, wherein the vertical position of the loading platform and the point of intersection of the diagonals of the identification points of the loading platform or the vertical position of the upper edge of the identification points of the container and the point of intersection of the diagonals of the identification points of the container describe the relative target position of the container.

39. Method according to claim 38, wherein the position coordinate is described by the absolute target position of the container or of the load suspension device, which is composed of the coordinates of the transport vehicle located in the parking position as detected by means of a camera and the relative target position of the container or of the load suspension device.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

40. Method according to claim 39, including moving the stacker crane into reach of the loading platform or of the container in such a way that the point of intersection of the diagonals of the fastener of the container or the load suspension device stands plumb above the point of intersection of the diagonals of the fastener of the loading platform or the container.

41. Method according to claim 40, including providing a second user-defined interface, said second user defined interface having four quadrants, each representing a pair of fasteners, and each pair consists of one fastener of the loading platform or of the container, projected by an image of the camera system, and of the coordinated fastener of the container or the load suspension device, projected by a superimposing of a computer-calculated contour of the container or of the load suspension means and of the fastener of the container or of the load suspension means onto the image.

42. Method according to claim 41, including determining any deviation in position of the container being loaded from the position of the loading platform or the position of the load suspension device from the position of the container being unloaded in the logistical management DP system for a fine-tuned positioning, by providing the second user-defined interface of logistical management with a second marking mechanism, wherein the operator selects at least one identification point of the loading platform or of the container with said second marking mechanism.

43. Method according to claim 42, including providing a fine positioning computer system and automatically recognizing any deviation in position of the container being loaded from the position of the loading platform or in the position of the load suspension device from the position of the container being unloaded with said fine positioning computer system.

44. Method according to claim 43, wherein a deviation in position of the container being loaded from the position of the loading platform of the container or in the position of the load suspension device from the container being unloaded, the load suspension device is rotated so that the fastener of the container stands plumb above the fastener of the loading platform, or the fastener of the load suspension device stands plumb above the fastener of the container.

UNITED STATES PATENT AND TRADEMARK OFFICE
CERTIFICATE OF CORRECTION

PATENT NO. : 7,415,320 B2
APPLICATION NO. : 10/506460
DATED : August 19, 2008
INVENTOR(S) : Jannis Moutsokapas It is certified that error appears in the above-identified patent and that said Letters Patent is hereby corrected as shown below:

45. Method according to claim 44, including setting down and releasing of the container from the load suspension device or the setting down of the load suspension device of the stacker crane onto the container by the operator until the fasteners mate with each other.

46. Method according to claim 45, including adjusting the position of a stacker crane in a container storage space, said adjusting the position comprising providing a camera system having at least one calibrated camera fastened on the trolley of the stacker crane for detection of the position of containers being handled, with an absolute length measuring system to detect the position of the stacker crane, positioning the stacker crane travels above a reference point arranged at any given position within the container yard, so that said at least one calibrated camera of the camera system detects the reference point, and comparing the position of the reference point with the memorized position of the reference point with the logical management DP system and determining an offset when a deviation exists.

47. Method according to claim 64, characterized in that the container yard has several reference points, which can be detected by the cameras of the stacker crane.

48. Method according to claim 45 for adjusting the position of the at least one calibrated camera, which is arranged on the stacker crane including defining an absolute length measuring system for detecting the position of the stacker crane, characterized in that the container yard has a super-reference point and said at least one calibrated camera is arranged on the stacker crane that can be adjusted relative to it by means of the super-reference point.

49. Method according to claim 4, wherein the automatically detecting of the coordinates of the loading platform of the transport vehicle or the coordinates of the container occurs in the identification zone.

50. Method according to claim 1, wherein the automatically detecting of the coordinates of the loading platform of the transport vehicle or the coordinates of the container occurs in the identification zone.

UNITED STATES PATENT AND TRADEMARK OFFICE
CERTIFICATE OF CORRECTION

| | |
|---|---|
| PATENT NO. | : 7,415,320 B2 |
| APPLICATION NO. | : 10/506460 |
| DATED | : August 19, 2008 |
| INVENTOR(S) | : Jannis Moutsokapas |

It is certified that error appears in the above-identified patent and that said Letters Patent is hereby corrected as shown below:

51. Method according to claim 32, wherein said detecting the coordinates of the identification points of the loading platform or the identification points of the container comprises providing a user-defined interface on a monitor screen of the logistical management DP system, and selecting by an operator of the identification points of the loading platform or the identification points of the container with a marking mechanism on the user-defined interface.

52. Method according to claim 32, including automatically detecting the coordinates of the identification points of the loading platform or the identification points of the container by a computer system and transferring the coordinates to the logistical management DP system.

53. Method according to claim 32, wherein said automatically detecting of the coordinates of the loading platform of the transport vehicle occurs in its loading and unloading zone and that of the coordinates of the loading platform of the container occurs in its loading and unloading zone.

54. Method according to claim 32, wherein the automatically detecting of the coordinates of the loading platform of the transport vehicle or the coordinates of the container occurs in the identification zone.

55. Method according to claim 32, wherein the vertical position of the loading platform and the point of intersection of the diagonals of the identification points of the loading platform or the vertical position of the upper edge of the identification points of the container and the point of intersection of the diagonals of the identification points of the container describe the relative target position of the container.

56. Method according to claim 32, wherein the position coordinate is described by the absolute target position of the container or of the load suspension device, which is composed of the coordinates of the transport vehicle located in the parking position as detected by means of a camera and the relative target position of the container or of the load suspension device.

UNITED STATES PATENT AND TRADEMARK OFFICE
CERTIFICATE OF CORRECTION

| | | |
|---|---|---|
| PATENT NO. | : 7,415,320 B2 | Page 6 of 8 |
| APPLICATION NO. | : 10/506460 | |
| DATED | : August 19, 2008 | |
| INVENTOR(S) | : Jannis Moutsokapas | |

It is certified that error appears in the above-identified patent and that said Letters Patent is hereby corrected as shown below:

57. Method according to claim 32, including moving the stacker crane into reach of the loading platform or of the container in such a way that the point of intersection of the diagonals of the fastener of the container or the load suspension device stands plumb above the point of intersection of the diagonals of the fastener of the loading platform or the container.

58. Method according to claim 32, including providing a second user-defined interface, said second user defined interface having four quadrants, each representing a pair of fasteners, and each pair consists of one fastener of the loading platform or of the container, projected by an image of the camera system, and of the coordinated fastener of the container or the load suspension device, projected by a superimposing of a computer-calculated contour of the container or of the load suspension means and of the fastener of the container or of the load suspension means onto the image.

59. Method according to claim 32, including determining any deviation in position of the container being loaded from the position of the loading platform or the position of the load suspension device from the position of the container being unloaded in the logistical management DP system for a fine-tuned positioning, by providing the second user-defined interface of logistical management with a second marking mechanism, wherein the operator selects at least one identification point of the loading platform or of the container with said second marking mechanism.

60. Method according to claim 32, including providing a fine positioning computer system and automatically recognizing any deviation in position of the container being loaded from the position of the loading platform or in the position of the load suspension device from the position of the container being unloaded with said fine positioning computer system.

61. Method according to claim 32, wherein a deviation in position of the container being loaded from the position of the loading platform of the container or in the position of the load suspension device from the container being unloaded, the load suspension device is rotated so that the fastener of the container stands plumb above the fastener of the loading platform, or the fastener of the load suspension device stands plumb above the fastener of the container.

62. Method according to claim 32, including setting down and releasing of the container from the load suspension device or the setting down of the load suspension device of the stacker crane onto the container by the operator until the fasteners mate with each other.

UNITED STATES PATENT AND TRADEMARK OFFICE
CERTIFICATE OF CORRECTION

PATENT NO. : 7,415,320 B2
APPLICATION NO. : 10/506460
DATED : August 19, 2008
INVENTOR(S) : Jannis Moutsokapas It is certified that error appears in the above-identified patent and that said Letters Patent is hereby corrected as shown below:

63. Method according to claim 32, including adjusting the position of a stacker crane in a container storage space, said adjusting the position comprising providing a camera system having at least one calibrated camera fastened on the trolley of the stacker crane for detection of the position of containers being handled, with an absolute length measuring system to detect the position of the stacker crane, positioning the stacker crane travels above a reference point arranged at any given position within the container yard, so that said at least one calibrated camera of the camera system detects the reference point, and comparing the position of the reference point with the memorized position of the reference point with the logical management DP system and determining an offset when a deviation exists.

64. Method according to claim 63, characterized in that the container yard has several reference points, which can be detected by the cameras of the stacker crane.

65. Method according to claim 32 for adjusting the position of the at least one calibrated camera, which is arranged on the stacker crane including defining an absolute length measuring system for detecting the position of the stacker crane, characterized in that the container yard has a super-reference point and said at least one calibrated camera is arranged on the stacker crane that can be adjusted relative to it by means of the super-reference point.--

This certificate supersedes the Certificate of Correction issued April 7, 2009.

Signed and Sealed this

Ninth Day of June, 2009

JOHN DOLL
*Acting Director of the United States Patent and Trademark Office*

(12) United States Patent
Moutsokapas

(10) Patent No.: US 7,415,320 B2
(45) Date of Patent: Aug. 19, 2008

(54) OPTICAL DEVICE FOR THE AUTOMATIC LOADING AND UNLOADING OF CONTAINERS ONTO VEHICLES

(75) Inventor: Jannis Moutsokapas, Monheim (DE)

(73) Assignee: Gottwald Port Technology GmbH, Dusseldorf (DE)

(*) Notice: Subject to any disclaimer, the term of this patent is extended or adjusted under 35 U.S.C. 154(b) by 179 days.

(21) Appl. No.: 10/506,460

(22) PCT Filed: Mar. 13, 2003

(86) PCT No.: PCT/EP03/02575

§ 371 (c)(1),
(2), (4) Date: Feb. 28, 2005

(87) PCT Pub. No.: WO03/078292

PCT Pub. Date: Sep. 25, 2003

(65) Prior Publication Data

US 2005/0192702 A1 Sep. 1, 2005

(30) Foreign Application Priority Data

Mar. 15, 2002 (DE) .................. 102 12 590

(51) Int. Cl.
G06F 7/00 (2006.01)
(52) U.S. Cl. .................................. 700/213
(58) Field of Classification Search .................. 700/213
See application file for complete search history.

(56) References Cited

U.S. PATENT DOCUMENTS

| 5,392,935 | A | * | 2/1995 | Kazama et al. | 212/278 |
| 5,920,480 | A | * | 7/1999 | Nakamura et al. | 700/114 |
| 6,052,627 | A | * | 4/2000 | Nakamura | 700/182 |
| 7,165,929 | B2 | * | 1/2007 | Janes et al. | 414/722 |

* cited by examiner

Primary Examiner—Gene O. Crawford
Assistant Examiner—Ramya G Prakasam
(74) Attorney, Agent, or Firm—Van Dyke, Gardner, Linn & Burkhart, LLP

(57) ABSTRACT

The invention relates to an automatic method for increasing the throughput of a container reloading point or a container storage space and for reducing the loading and unloading time for a container transport vehicle. According to said method, after the identification of a container transport vehicle, the loading platform of the transport vehicle that has been parked in the parking area of the container storage space is measured. The position co-ordinates of the loading platform are determined by a data processing system. The container to be loaded is then automatically positioned by means of a crane, using the position co-ordinates of the loading platform. To align the container exactly in relation to the loading platform, the latter is measured again and any deviation in relation to the position of the container thus obtained is used for said exact alignment. The container is deposited on the platform automatically. The unloading of a container transport vehicle involves practically identical steps.

65 Claims, 14 Drawing Sheets